(12) United States Patent
Marshall

(10) Patent No.: US 7,369,909 B2
(45) Date of Patent: May 6, 2008

(54) PRODUCING THREE-DIMENSIONAL OBJECTS FROM DEFORMABLE MATERIAL

(76) Inventor: Adrian Richard Marshall, 13 Longwall, Haddenham, Aylesbury, Buckinghamshire (GB) HP17 8DL ( * ) Notice: Subject to any disclaimer, the term of this patent is extended or adjusted under 35 U.S.C. 154(b) by 0 days.

(21) Appl. No.: 10/554,824

(22) PCT Filed: Apr. 30, 2004

(86) PCT No.: PCT/GB2004/001882

§ 371 (c)(1),
(2), (4) Date: Oct. 27, 2005

(87) PCT Pub. No.: WO2004/095938

PCT Pub. Date: Nov. 11, 2004

(65) Prior Publication Data

US 2006/0269643 A1    Nov. 30, 2006

(30) Foreign Application Priority Data

Apr. 30, 2003    (GB) ................................ 0309888.6

(51) Int. Cl.
*G06F 19/00*    (2006.01)
(52) U.S. Cl. .................... 700/98; 700/118; 700/159; 700/160
(58) Field of Classification Search ............ 700/95, 700/97, 98, 117, 118, 119, 120, 159, 160, 700/179, 182, 197, 200, 163; 425/375
See application file for complete search history.

(56) References Cited

U.S. PATENT DOCUMENTS

| | | | | |
|---|---|---|---|---|
| 4,436,684 A | * | 3/1984 | White | ...................... 700/163 |
| 5,575,597 A | * | 11/1996 | Bailey et al. | ............... 409/201 |
| 5,667,824 A | | 9/1997 | Ream et al. | |
| 5,733,587 A | | 3/1998 | Ream et al. | |
| 6,021,270 A | | 2/2000 | Hanaki et al. | |
| 6,264,780 B1 | | 7/2001 | Iwanaga et al. | |
| 6,450,393 B1 | * | 9/2002 | Doumanidis et al. | ...... 156/73.1 |
| 6,948,910 B2 | * | 9/2005 | Polacsek | ........................ 416/1 |
| 2002/0077796 A1 | | 6/2002 | Mark et al. | |

FOREIGN PATENT DOCUMENTS

| | | | |
|---|---|---|---|
| EP | 0 899 080 A | 3/1999 |
| EP | 1 216 806 A | 6/2002 |
| GB | 650 067 A | 2/1951 |
| GB | 1 319 240 A | 6/1973 |
| GB | 2 122 131 A | 1/1984 |
| JP | 2001-101246 A | 4/2001 |
| JP | 2002-086453 A | 3/2002 |

* cited by examiner

*Primary Examiner*—Leo Picard
*Assistant Examiner*—Charles Kasenge

(57) ABSTRACT

Three-dimensional objects are produced from a deformable material received substantially continuously in the direction of production and the objects are produced by a deforming process substantially in the direction of production. Rotatable devices are arranged to deform a respective section of the deformable material with at least one of the rotatable devices being shaped so as to vary the extent of deformation applied to the deformable material periodically as a deformable material passes through in the direction of production.

20 Claims, 20 Drawing Sheets

PRODUCING THREE-DIMENSIONAL OBJECTS FROM DEFORMABLE MATERIAL

BACKGROUND OF THE INVENTION

The present invention relates to producing three-dimensional objects from deformable material.

Techniques for producing three-dimensional objects from deformable material are known. Moulding processes are known in which deformable material in liquid form is applied to a mould and allowed to set. The object must then be removed from the mould for subsequent processing to be performed. Consequently, moulding of this type is essentially a batch process requiring a finite time for the operations to be completed. Moulding tends to be performed as a separate process with moulded objects being held temporarily in storage or transported from one location to another.

An alternative technique for producing three-dimensional objects is extrusion. Extrusion allows objects to be produced in a substantially continuous manner and facilitates the production of objects at locations where they are required. However, a problem with known extrusion techniques is that the extent to which shapes may be changed is somewhat limited, given that the extrusion process produces three-dimensional objects of constant cross section.

BRIEF SUMMARY OF THE INVENTION

According to an aspect of the present invention, there is provided apparatus for producing three-dimensional objects from a deformable material, comprising deforming means configured to receive deformable material substantially continuously in a direction of production and to produce three-dimensional deformed items substantially in said direction of production, wherein said deforming means includes a plurality of rotatable devices each arranged to deform a section of deformable material and at least one of said plurality of rotatable devices is shaped so as to vary the extent of deformation applied to the deformable material periodically as said deformable material passes through the deforming means.

The apparatus may be used for producing many different types of objects from many different types of materials. In a preferred embodiment, the objects are novelty or decorative objects and the deformable material may be a confectionery material. Thus, edible deformable material may be formed into shapes such as animal shapes for application to cakes and other confectioneries.

The number of rotatable devices present is variable and could possibly range from three to twelve for example. In a preferred application, six rotatable devices are provided.

An advantage of the present invention is that it allows complete three-dimensional objects to be defined with variable cross section in a continuous moulding process. Thus, in a preferred embodiment, each of the rotatable devices is shaped so as to allow deformation to be imparted upon substantially the totality of the material, thereby deforming the material such that it has variable section.

In a preferred embodiment, each of the rotatable devices has a bi-conical shape, with each cone defining a circular base, sloping sides and an apex. The bi-conical shape is thereby designed by two cones extending from a shared base and thus defining a substantially circular edge. Preferably, material is removed from this edge to thereby define a varying deforming surface.

In a preferred embodiment, the plurality of deforming bi-conical rotatable devices are supported in a cradle so as to mutually interact. The mutual interaction may be enhanced by the presence of co-operating gear teeth and a property of the interacting gear teeth may vary between devices so as to discourage the incorrect ordering of the devices within the cradle.

According to a second aspect of the present invention, there is provided a rotatable device for use in apparatus for shaping a deformable material, comprising a first substantially conical surface for engagement with a similar co-operating surface of a second similar rotatable device; a second substantially conical surface for engagement with a similar co-operating surface of a third similar device; and a deforming edge between said first surface and said second surface of variable shape, wherein said deforming edge is arranged to deform material while being rotated.

Preferably, the variable shape of the deforming edge is produced by a machining operation upon a bi-conical blank.

According to third aspect of the present invention, there is provided a method of producing three-dimensional objects, comprising the steps of defining a three-dimensional data model; segmenting said data model into a plurality of data model segments; producing rotatable devices having a deforming surface for each of said model segments; arranging said rotatable devices in a co-operating configuration to define a direction of production; and passing deformable material in said direction of production so as to produce three-dimensional objects via a varying cross-section.

In a preferred embodiment, the three-dimensional data model is defined by a cylindrical co-ordinate system.

Preferably, the rotatable device is bi-conal and defines an edge. Preferably, the deformable surface is defined by removing material from the edge.

In a preferred embodiment, the rotatable devices rotate together in a mutually co-operating configuration.

According to a fourth aspect of the present invention there is provided a method of processing three-dimensional data for the production of three-dimensional objects, comprising the steps of defining a three-dimensional data model in which a plurality of three-dimensional points define a surface; identifying a production axis; rearranging said data points into well-ordered points defined by cylindrical co-ordinates with respect to said production axis; segmenting said rearranged data points to produce a plurality of data model segment data that are mutually separated along said production axis; and translating said data model segment data to produce control instructions for a production machine.

Preferably, the three-dimensional data is produced by scanning a physical object in a helical path and said rearranging step rearranges said helically positioned points into cylindrically positioned points.

Preferably, the well-ordered points define a plurality of cross-sectional profiles with the same number of points on each cross-sectional profile, with points on the first cross-sectional profile being substantially aligned with similar points on an adjacent cross-sectional profiles.

WRITTEN DESCRIPTION OF THE BEST MODE FOR CARRYING OUT THE INVENTION

FIG. 1

Figure 1:
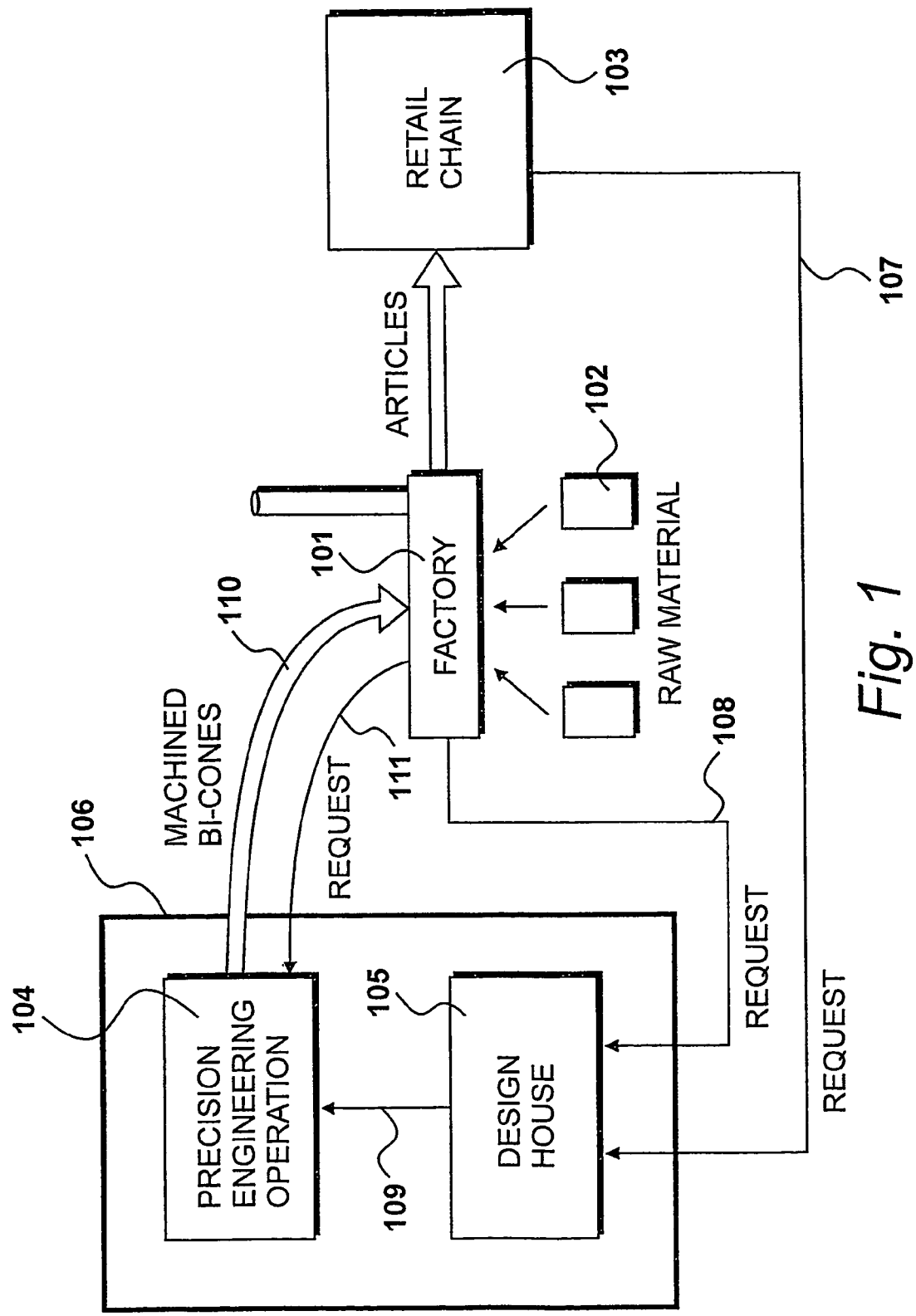
FIG. 1 shows an environment within which three-dimensional objects are produced.

An environment within which three-dimensional objects are produced from deformable material is illustrated in FIG. 1. The deformation processing is performed by a factory establishment 101 and it can be appreciated that many factory establishments of this type could operate the procedures described herein.

Within factory establishment 101 deforming stations are provided that include rotatable devices arranged to deform a section of substantially deformable material. The rotatable devices are shaped so as to vary the extent of deformation applied to the deformable material periodically as the material is fed through.

The factory establishment 101 receives raw material 102 which could include any material that is substantially deferrable, or deformable following heat or chemical treatment, and from which individual three-dimensional objects are required. Thus, the raw material could include industrial type materials with the factory establishment 101 being configured to produce engineering items for subsequent assembly. In an alternative application, which provides the basis for an example of an embodiment described herein, the raw materials 102 include food-stuff materials and the factory establishment 101 is involved with the production of confectionery items. In the procedures subsequently disclosed herein, that merely provides an example of an application, the factory 101 will produce three-dimensional objects from edible materials such as liquorice shaped in the form of an animal or toy and in particular in this example shaped in the form of a cat. Thus, the factory establishment 101 produces products (liquorice cats or items that include liquorice cats) which are then supplied as product to a retail chain or retail outlet 103.

Factory establishment 101 includes deforming stations that in turn include rotatable devices that are shaped in such a way as to produce three-dimensional objects shaped as required. In the embodiment illustrated in FIG. 1, these rotatable devices are received from a precision engineering operation 104 that is arranged to produce the rotatable devices to order given that a new shape may be required or worn out devices may need replacement. The rotatable devices are themselves of a substantially bi-conal configuration and are referred to herein as "bi-cones".

The precision engineering operation produces bi-cones in response to numerical instructions for operating computer numerically controlled milling machines, stereo lithography machines, or similar machines. In this embodiment, the numerical instructions for operating CNC machines are received from a design house 105 although, as illustrated by box 106 it would be possible for the design house to be part of the precision engineering operation. These in turn could be part of the factory establishment and, ultimately the whole facility could be under the control of a retail chain. However, it is also possible for the design house 105, the precision engineering operation 104 and the factory establishment 101 to be completely independent. Thus, retail chain 103 may make a request, as illustrated by line 107, to the design house 105 to the effect that a particular object shape is required to be made in a particular material. Similarly, factory 101 may also make a similar request, as illustrated by line 108. Requests from retail chain 103 or factory 101 may take the form of a fully specified three-dimensional data model or, alternatively, the request may take the form of a less detailed specification such as "we would like cats made of liquorice".

Thus, under these circumstances it would be necessary for the design house to identify an appropriate physical model, possibly by modelling physical objects using plasticine or similar materials. This could result in several physical models being produced for presentation to the retail chain or the factory for type approval. Thereafter, with the a plasticine model approved, the scanning operation and data processing operations are performed so as to produce data that may be supplied to the precision engineering operation 104, as illustrated by line 109.

In response receiving the numerical instructions from design house 105, the precision engineering operation 104 produces bi-cones and supplies these to factory establishment 101, as illustrated by arrow 110. If an additional set of cones is required, either in response to increased demand or as a replacement, a request is made back to the precision engineering operation, as illustrated by line 111. As previously described, if the factory establishment 101 requires machined bi-cones for a different object, a request of this nature is supplied to the design house 105 as illustrated by line 108. Thus, with the bi-cones in place, the factory establishment in 101 is in a position to produce objects which will then be supplied as product articles to retail chain 103.

FIG. 2

Figure 2:
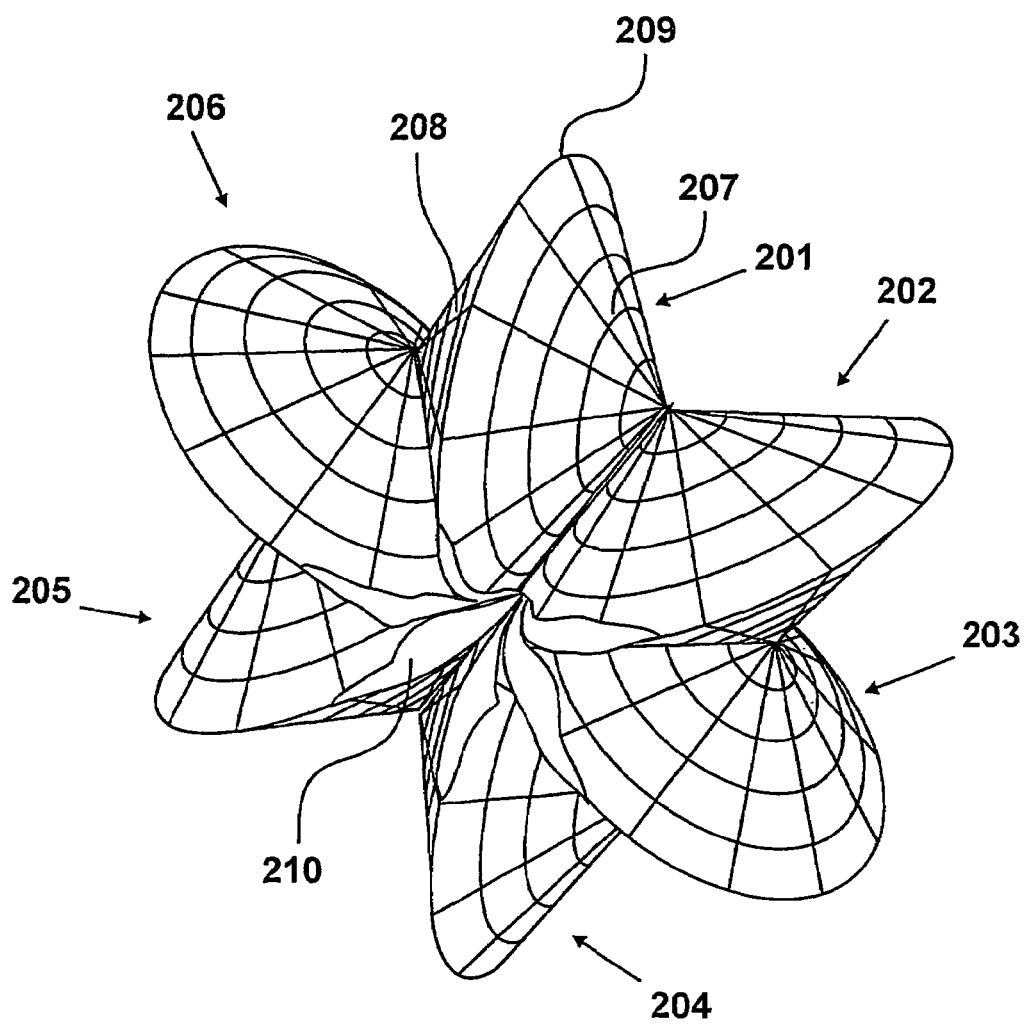
FIG. 2 shows a schematic representation of rotatable forming devices.

At deforming stations, rotatable devices are provided as illustrated schematically in FIG. 2. In this example, six rotatable devices 201 to 206 are provided. In this embodiment, the shape of the rotating devices has been described as bi-conal in that each device, such as device 201, includes a first cone shape 207 with a circular base and a second cone shape 208 again with a circular base; the two circular bases being co-joined. The joining of these bases presents a circular edge 209 and it is this edge that is machined away, as illustrated at 210 of bi-cone 204, that provides a shape which in turn varies the extent of a deformation applied to a deformable material as the deformable material passes through.

The bi-cones 201 to 206 mutually interact such that the rotation of one will result in the rotation of all. The machined away edges, such as edge 210, presents, in combination, an orifice through which the deformable material may pass in a production direction and in a substantially extrusion-like manner. However, unlike an extrusion processes, the profile of the orifice varies as the bi-cones rotate such that the object appearing from the process may have a fully formed three-dimensional shape. Thus, in combination, the bi-cones provide what may be considered as a variable section extrusion-like orifice. In this way, many shapes are possible, provided that the capability exists for machining bi-cone blanks in response to numerical data that reflects the original intended shape. Furthermore, a mechanical configuration is required in order to support and drive the cones and an engineered exemplar embodiment is disclosed herein.

FIG. 3

Figure 3:
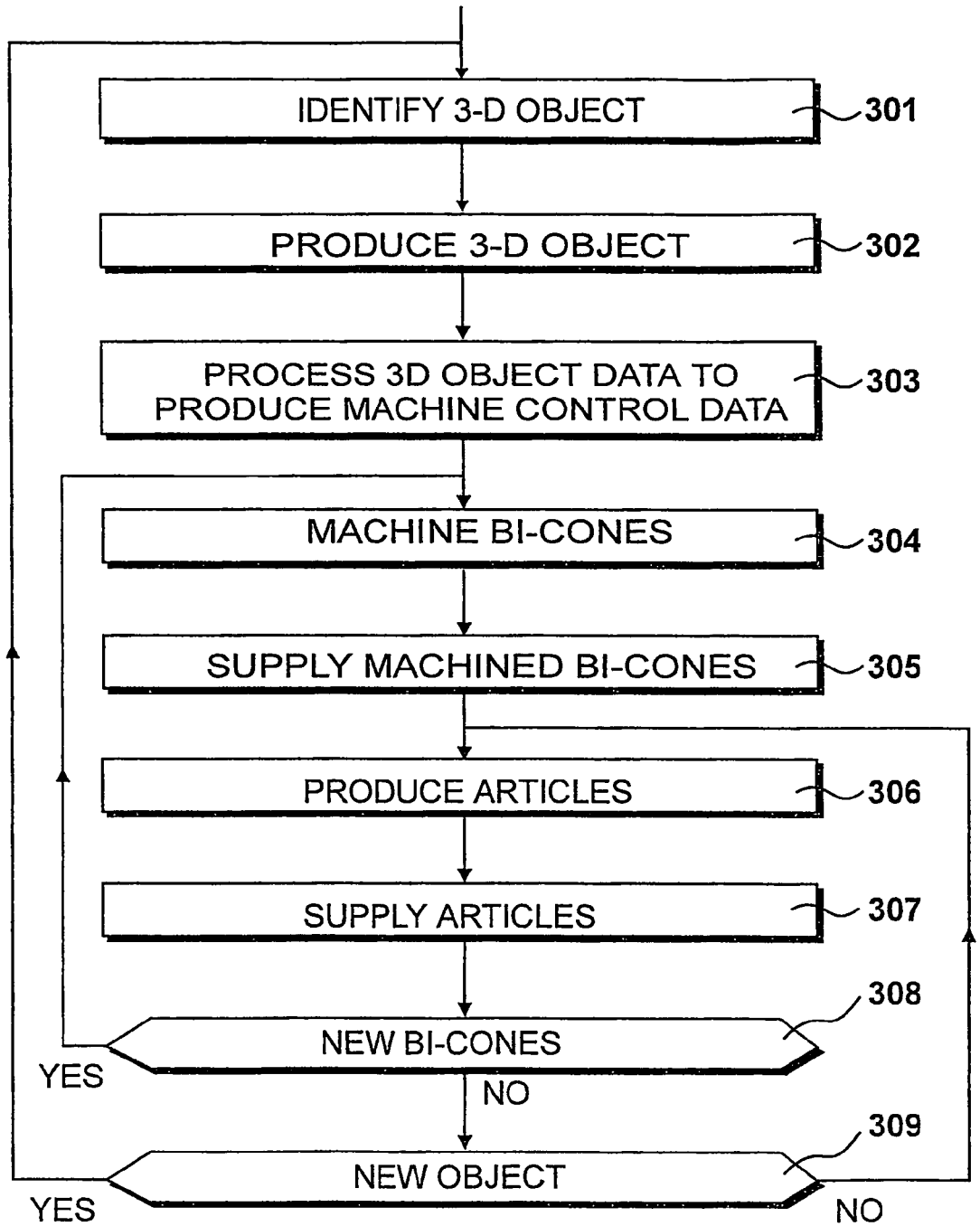
FIG. 3 shows procedures performed within the environment of FIG. 1.
Figure 4:
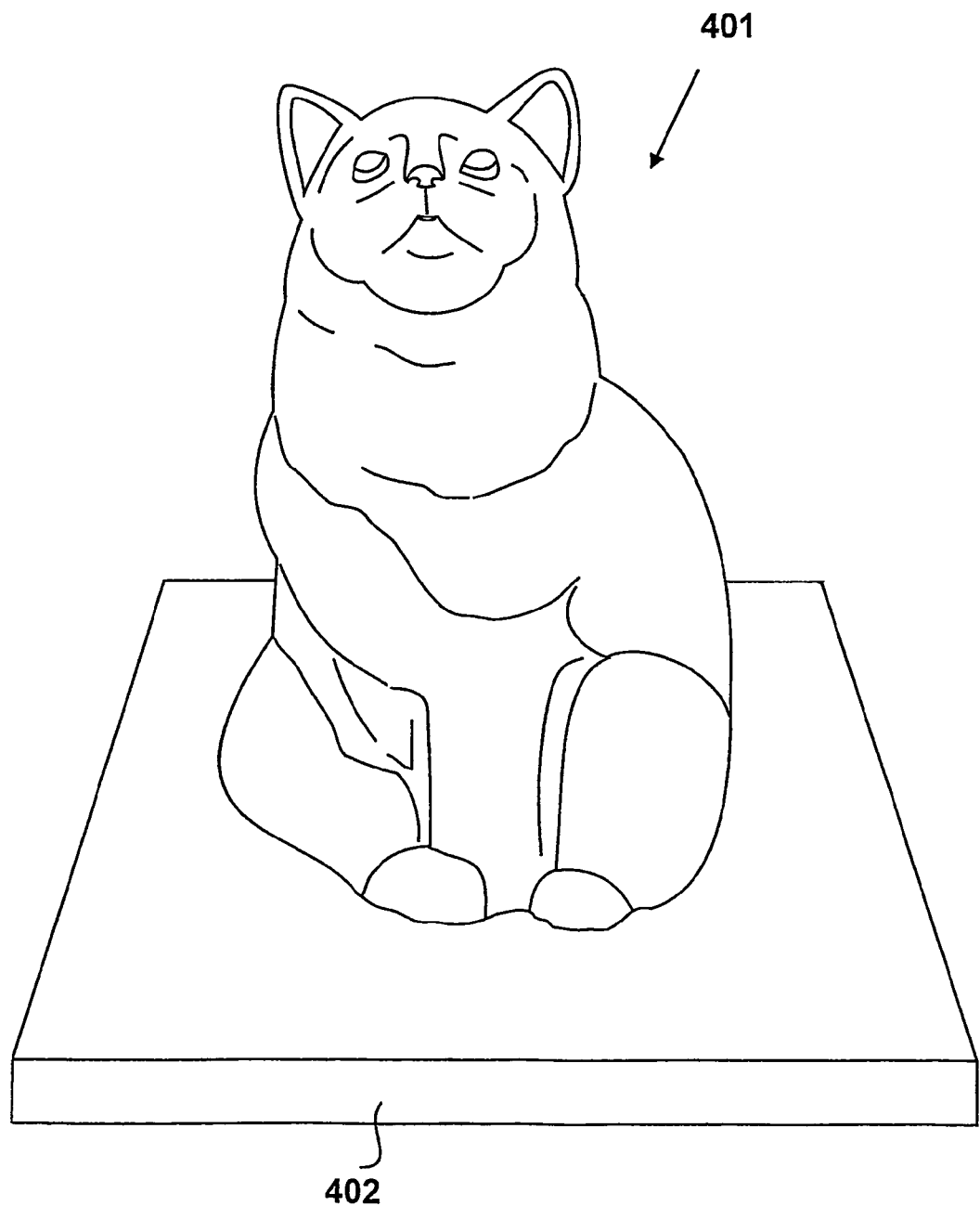
FIG. 4 shows a cat object 401 moulded in plasticine supported by a plinth 402.

Procedures performed within an environment such as that illustrated in FIG. 1 using the technique shown schematically in FIG. 2, are illustrated in FIG. 3.

At step 301 a three-dimensional object is identified from which a product is to be made. Thus, as used herein, the "object" refers to the particular shape under consideration and products that embody the shape of the object will be referred to as "articles".

At step 302 three-dimensional data is produced that represents the shape of the object identified at step 301. This three-dimensional data may be present in many forms but often it will be generated by scanning a physical model embodying the shape of the object from which the object data is produced.

At step 303 three-dimensional data produced at, step 302 is processed so as to produce machine-controlled data such as that required for operating computer numerically controlled machines, stereo lithography machines, or similar devices. It can be appreciated that in order to use the technique illustrated with respect to FIG. 2, significant data processing is required in order to convert the three-dimensional object data into something that can be used to machine individual bi-cone blanks.

At step 304 the bi-cones are machined such that they may then be supplied as machined product to a factory establishment, such as establishment 101.

At step 306 the articles are produced by the factory 101 such that they may then be supplied to the retail chain 103 as illustrated by step 307.

It is appreciated that wear will occur to the bi-cones therefore it may be necessary to obtain new bi-cones as illustrated by the question at step 308 which, when affirmative, results in new bi-cones being machined at step 304. Alternatively, it may be preferable to produce articles embodying a different object therefore the question asked at step 309 being answered in the affirmative results in an alternative three-dimensional object being identified at step 301. Alternatively similar articles are produced at step 306.

FIG. 4

As identified in FIG. 3, step 301 involves the identification of a three-dimensional object. In this example, for the purposes of illustration only, the shape of a cat has been selected as a three-dimensional object. Consequently, a cat object 401 is moulded in plasticine and is shown supported by a plinth 402. The plasticine model has been approved and it is now necessary to produce three-dimensional object data as identified at step 302.

FIG. 5

Many procedures may be invoked for the production of three-dimensional object data, as required by step 302. In this example, the plasticine cat 401 is scanned by supporting the cat about a central axis 501 such that the cat may be rotated in the direction of arrow 502. As this rotation takes place, a scanning device, possibly in the form of a mechanical probe or in the form of an optical device traverses vertically in the direction of arrow 503. At regular intervals, at a known locations, a dimension of the surface is measured allowing a three-dimensional position to be recorded, representing a point on the surface of the model 401. Thus, the model 401 is effectively scanned in a helical fashion, as represented by helical scan lines 504.

FIG. 6

Figure 6:
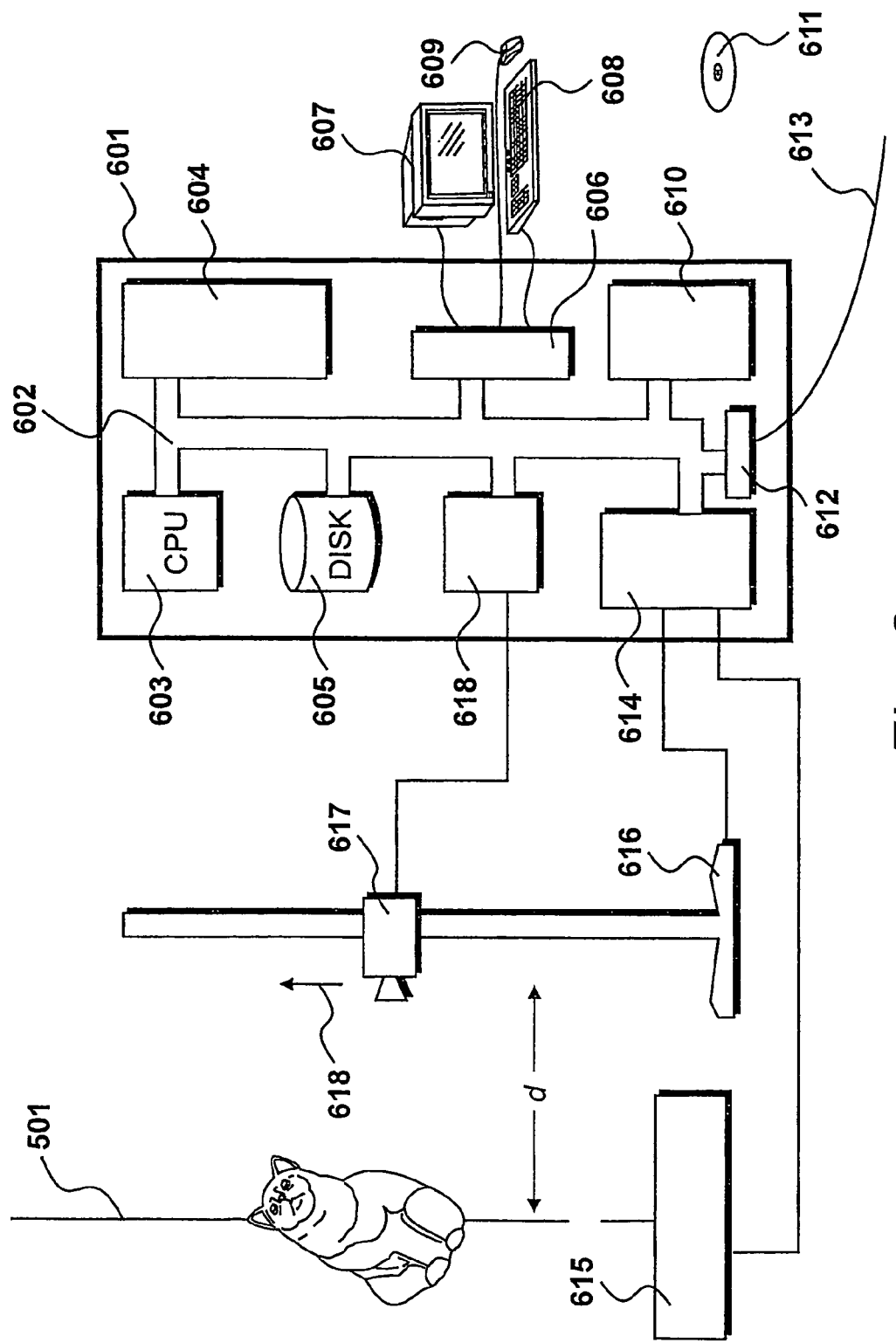
FIG. 6 shows the scanning system including processing system 601.

As illustrated in FIG. 6, the scanning operation is performed under computer control. In the embodiment, a processing system 601 is provided having a system bus 602 providing communication between a central processing unit 603, random access memory devices 604, a hard disk store 605 and interface circuits. These interface circuits include a circuit 606 for providing a graphical user interface to a monitor 607 and for receiving manual input commands from a keyboard 608 and a mouse 609. A reader/writer for computer-readable medium, such as a DVD reader/writer 610 is provided. The DVD reader 610 is configured to receive DVDs such as DVD 611 that includes program instructions for installation on hard disk 605. Device 610 is also arranged to provide for the recording of output data such that machine-readable control data may be written to and supplied on DVDs or similar devices.

Alternatively, a network interface circuit 612 provides for communication over networks via a network cable 613. Thus, control data may be supplied locally via a network or may be supplied to any location via the Internet.

Figure 5:
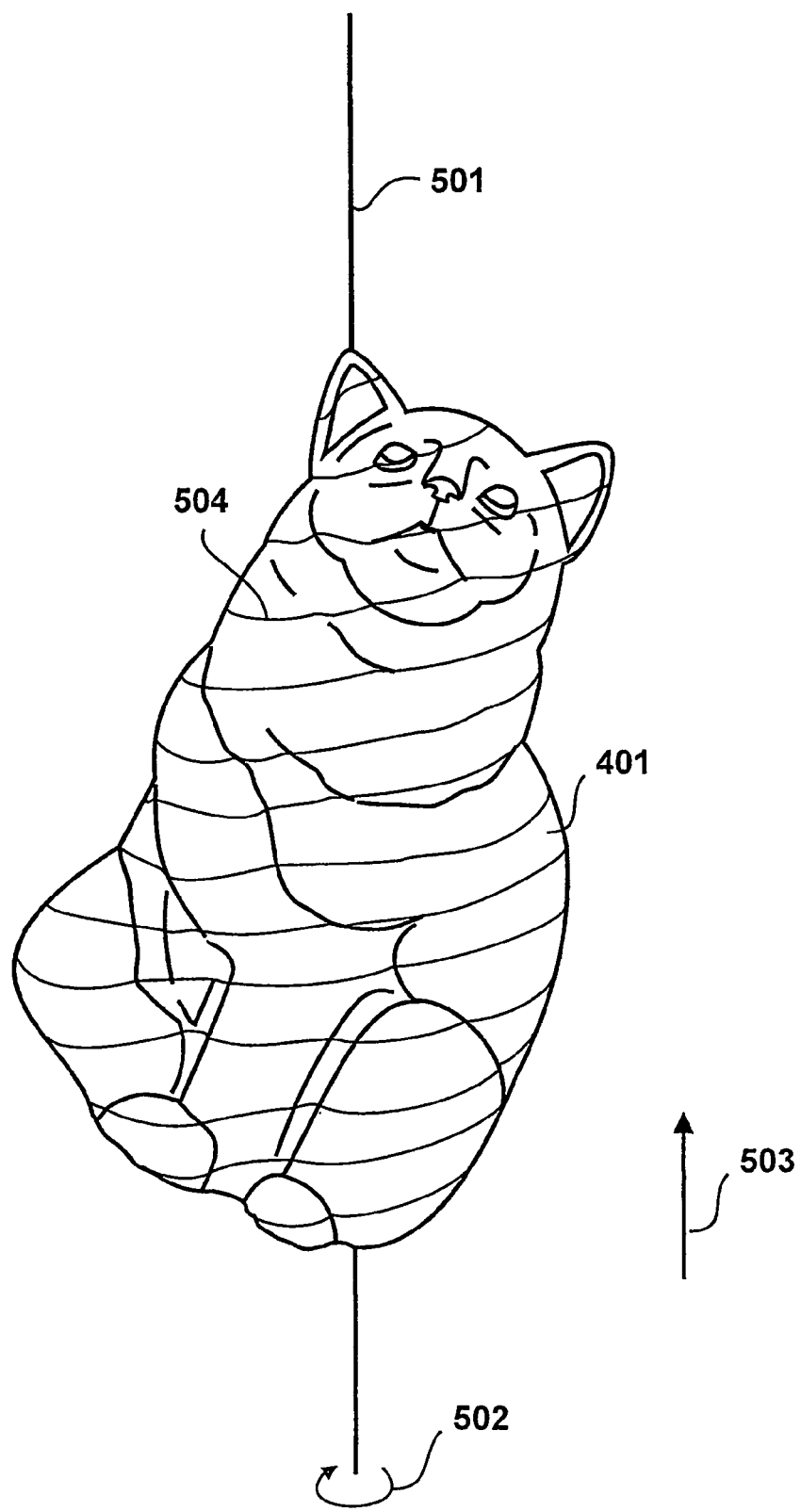
FIG. 5 shows the plasticine cat 401 being scanned while rotating the cat about a central axis 501 in the direction of arrow 502.

An output controller 614 provides output drive signals to a turntable 615 and to a vertical scanning drive system 616. An optical scanning device 617 provides a signal to an input circuit 618. Thus, turntable 615 rotates while scanning device 617 ascends in the direction of arrow 618. In this way, data points lying on a helical scan are produced, as illustrated in FIG. 5.

After performing a helical scan, the position points are held in memory 604 each point represents a distance from the scanning device 617 to the surface of the object being scanned. These are converted to radial measurements by subtracting each value from an offset value, representing the distance d from the scanning device to the axis of rotation 501.

Having produced the three-dimensional object data and stored this data in memory 604, the data may be stored to disk 605, written to external storage via 610 or transmitted over network connection 613. Furthermore, processing system 601 may also be configured to process the three-dimensional object data to produce machine-controlled data, as identified at step 303.

FIGS. 7, 8, 9 and 10

Figure 7:
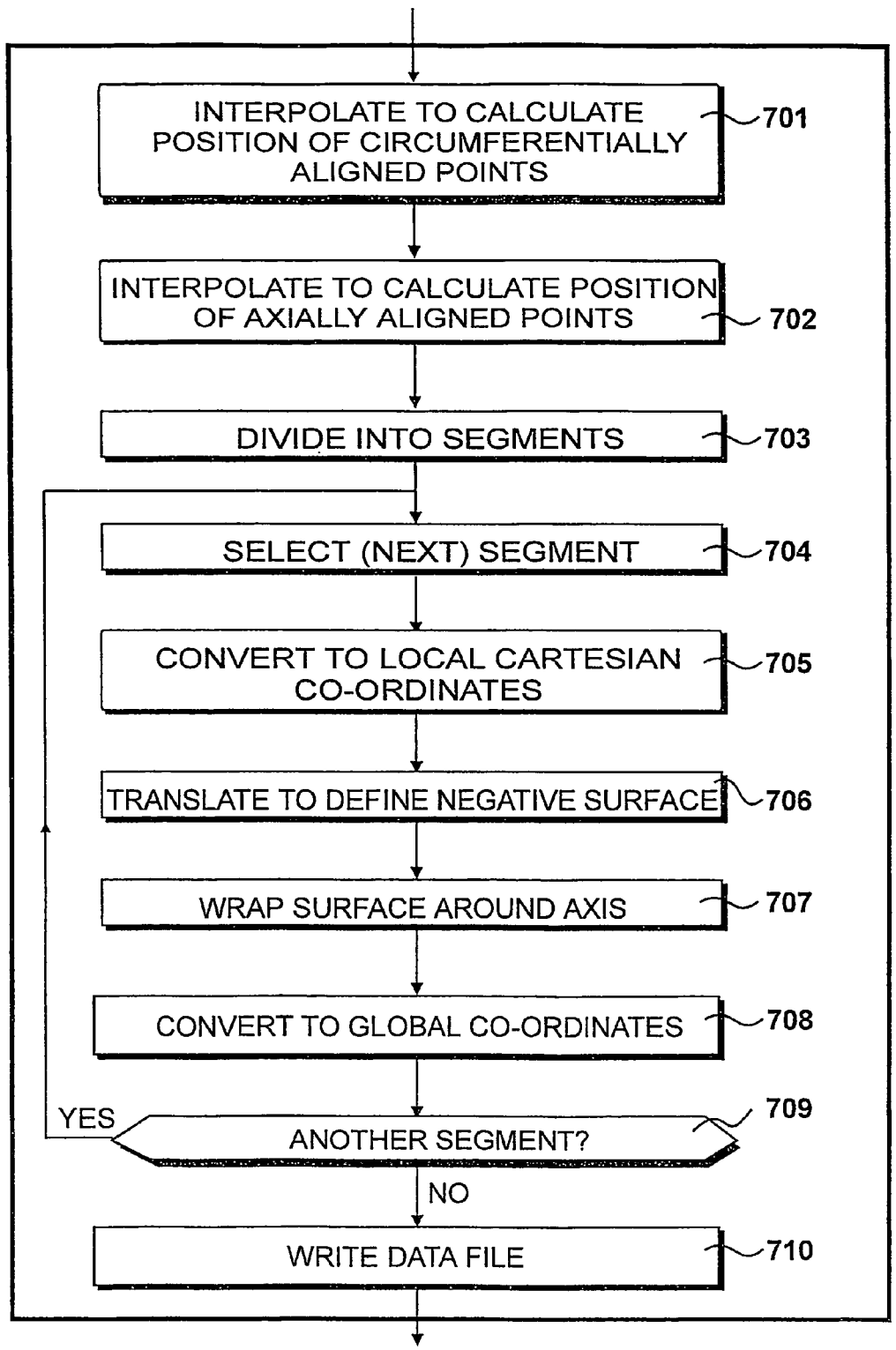
FIG. 7 shows details of the procedures for processing the three-dimensional object data to produce machine-controlled data.

Procedures for processing the three-dimensional object data to produce machine-controlled data are detailed in FIG. 7. The data points of the object are defined in cylindrical co-ordinates. The value of interest is the radial distance, r, of the surface of the object from the central axis 501.

The position of this surface is then defined in terms of its longitudinal or vertical displacement z along the axis 501 and its angle of rotation from an arbitrarily defined perpendicular axis.

At step 701 values of r are interpolated to calculate new values of r at positions that are circumferentially aligned. In this way, points are generated that are aligned for each rotation of the object and account is also taken of the fact that it would be necessary to segment the object along radial planes extending from the axis 501. Thus, the circumferential positions should identify preferred locations of the intersecting plane and should also ensure that an appropriate number of points are provided within each section. Usually, the object would be scanned at a higher definition than required in the final tools therefore it is possible for a degree of data loss to occur during the interpolation processes, thereby producing a data set with a preferred number of specified points.

Figure 8:
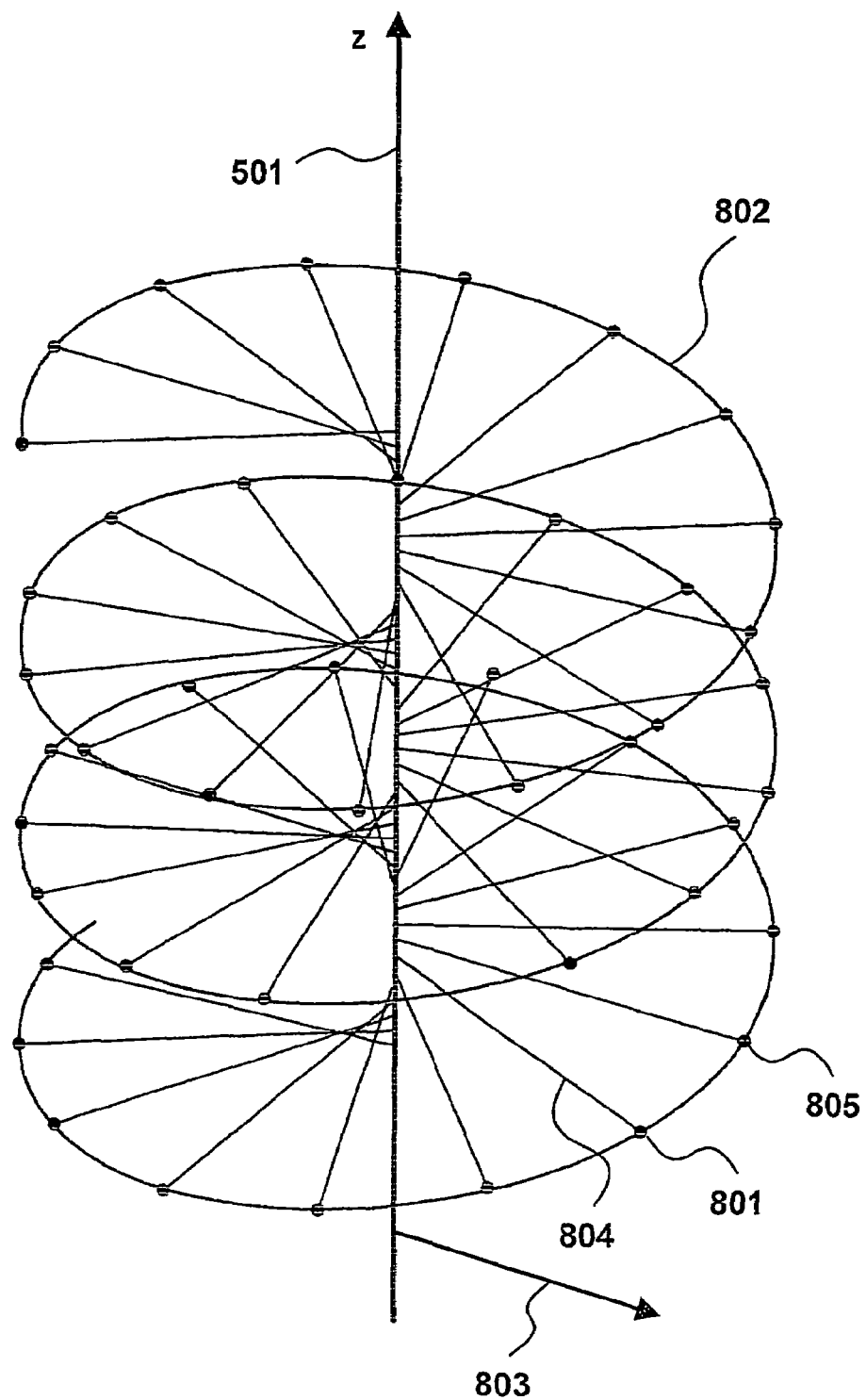
FIG. 8 shows a number of data points whose positions were measured during the process step 302.
Figure 9:
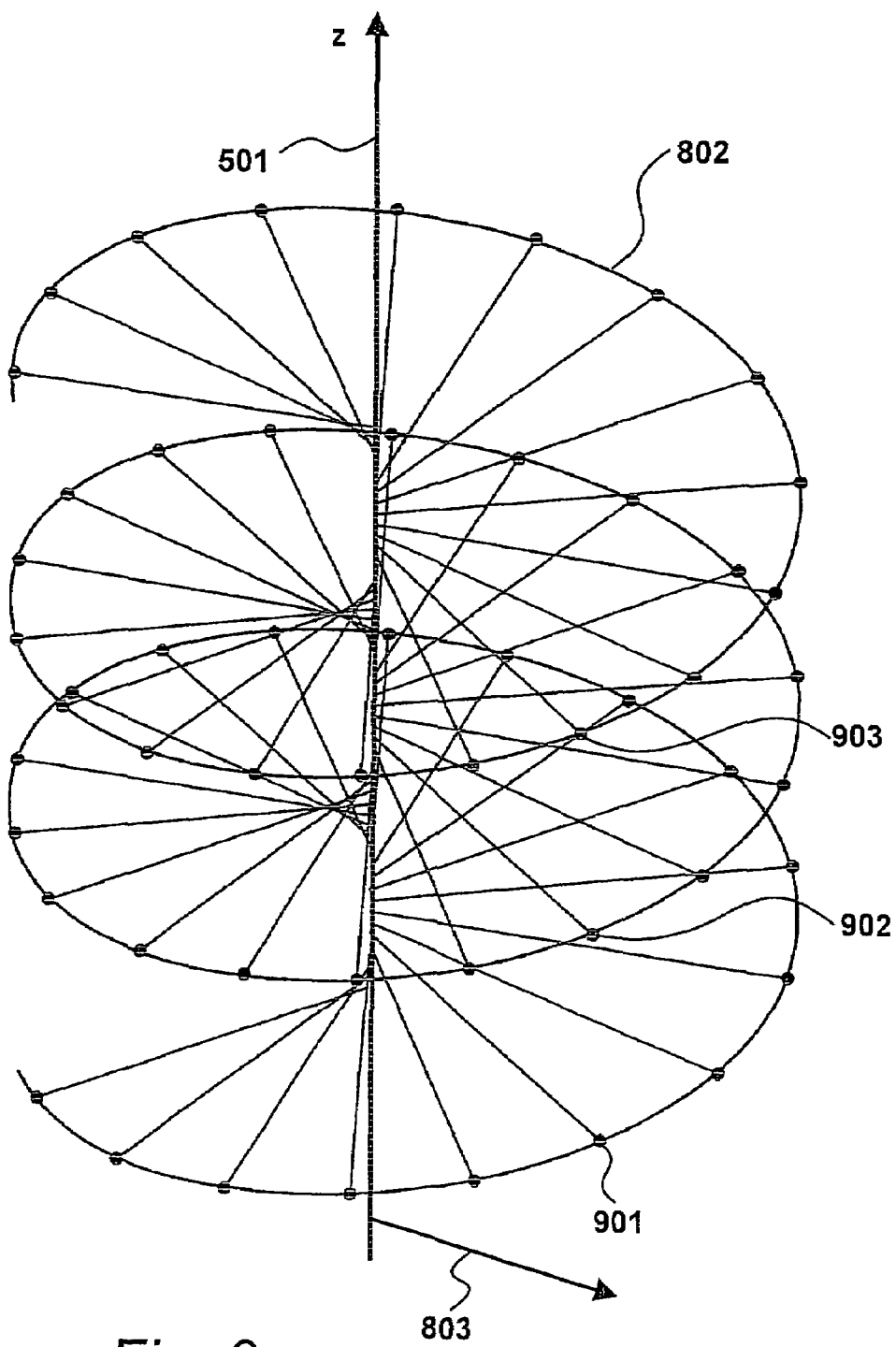
FIG. 9 shows points generated by process step 701, on the spiral line 802 of FIG. 8.

The process step 701 is illustrated by FIGS. 8 and 9. FIG. 8 illustrates a number of data points whose positions were measured during the process step 302. Thus, the data points, such as point 801 lay on a spiral line 802 corresponding to a section of the helical scan lines 504 of FIG. 5. Each point has a position defined by it position along the z axis 501, its perpendicular distance r from the z axis, and the angle of rotation between the arbitrarily defined axis 803 and a line 804 joining the point with the z axis.

The points on this axis are separated circumferentially by an amount determined by the rotation of the scanned object and the frequency with which positions were measured. Consequently, the points are not necessarily vertically aligned from one loop of the spiral 802 to the next loop. Thus, for example, the line 804 joining point 801 with the z axis is not in the same plane as any of the other lines joining other points with the z axis.

At step 701 interpolation of the data points is performed so as to calculate co-ordinates of points having angular alignment. For example, if it is required to generate new data points on a vertical plane lying between neighbouring points 801 and 805, linear interpolation may be performed using the r values of points 801 and 805 and the ratio of the distances of point 801 and 805 from that plane to generate the r value of a new point on that plane. Similarly, linear interpolation may be used to determine the z ordinate of the new point.

FIG. 9 illustrates points generated by process step 701, on the spiral line 802 of FIG. 8. The process step 701 calculates values of r for points at predetermined angles from the arbitrary axis 803. Thus, as shown in FIG. 9 each point on the spiral line 802 shares the same vertical plane as the z axis and a point on each of the other loops of the spiral. For example, the generated point 901 is within the same plane as the z axis 501 and points 902 and 903.

In the illustrated example of FIG. 9 the predetermined angle is 20 degrees and therefore there are exactly 18 points on each loop of the spiral line. Since 18 is a multiple of 6, i.e. the required number of bi-cones, this allows a later process step 703 to be simplified. It should be noted that in practice the number of points on each loop would be many more than illustrated here, in order to provide sufficient definition.

At step 702 interpolation is performed on the values calculated at step 701, so as to calculate the position of axially aligned points. Thus, new values of r are calculated for points at predetermined values along the z axis. For example, if it is required to generate points on a plane lying between points 901 and 902 linear interpolation may be performed using the r values of points 901 and 902 and the ratio of the distances of point 901 and 902 from that plane.

Figure 10:
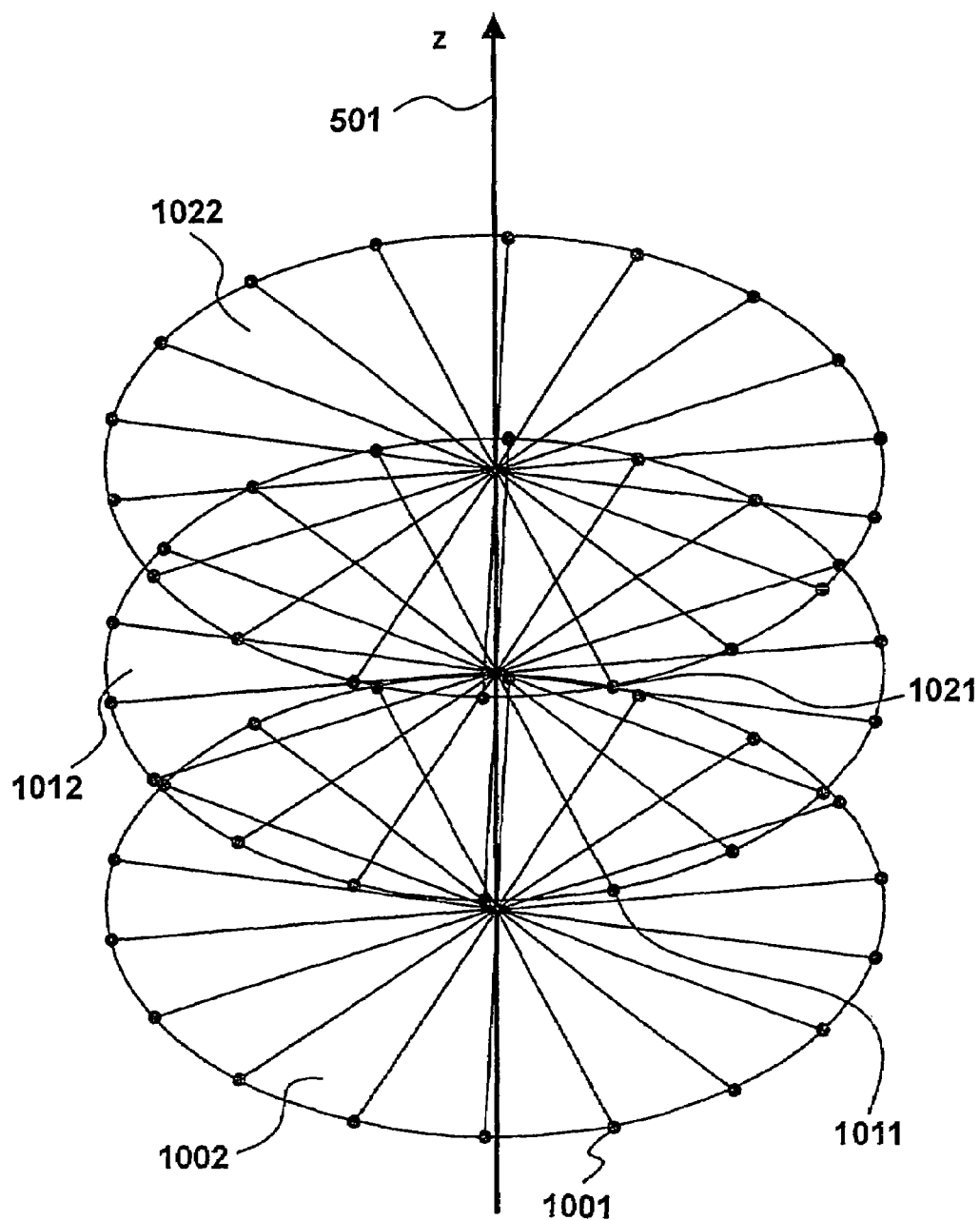
FIG. 10 shows a number of points generated at step 702 disposed on planes, such as plane 1002, equally spaced along the z axis 501.

Points generated at step 702 are illustrated in FIG. 10. As shown in FIG. 10, the newly generated points, such as point 1001 are disposed on planes, such as plane 1002, equally spaced along the z axis 501. Also, due to the interpolation step 701, each point is disposed in the same plane as the z axis and a point in every other plane. For example point 1001 is disposed in a vertical plane with the z axis and points 1011 and 1021 in planes 1012 and 1022 respectively.

Thus, step 702 has the effect of replacing the continuous nature of the vertical movement in the direction of arrow 616 (producing a helical scan) by a discrete operation thereby defining a collection of horizontal planes at specified distances in the z direction. This in turn represents a longitudinal definition of the articles in the direction of production.

At step 703 the data volume, illustrated by the data points in FIG. 10, is divided into segments and, in this embodiment, the data volume is divided into a total of six segments, corresponding to the requirement for the production of six bi-cones.

At step 704 a segment is selected and at step 705 the data points represented in cylindrical co-ordinates are converted to local Cartesian co-ordinates.

The Cartesian coordinates developed at step 705 define the positive shape of the object therefore at step 706 a translation is performed to define a negative surface.

The negative surface defined at step 706 still represents a linear section of the object therefore at step 707 the negative surface is wrapped around an axis to define the surface of a machined edge of a bi-cone, such as machined edge 210 of FIG. 2.

After the process step 707 the negative surface is defined by points that are each defined in terms of a local co-ordinate system. Consequently, at step 708 global Cartesian co-ordinates are calculated for each point in the segment.

At step 709 a question is asked to determine whether another segment is to be selected and processed. If the answer is yes then steps 704 to 708 are repeated for the next segment. Thus, the process loops around steps 704 to 709 until all segments, in this case six segments, have been processed.

If the question of step 709 is answered no, then step 710 is performed, in which the data points generated at step 708 are written to a file. This may be stored on a CD-ROM, DVD, hard drive or other storage device.

On completion of step 710, step 303 is completed and step 304 may be performed.

FIG. 11

Figure 11:
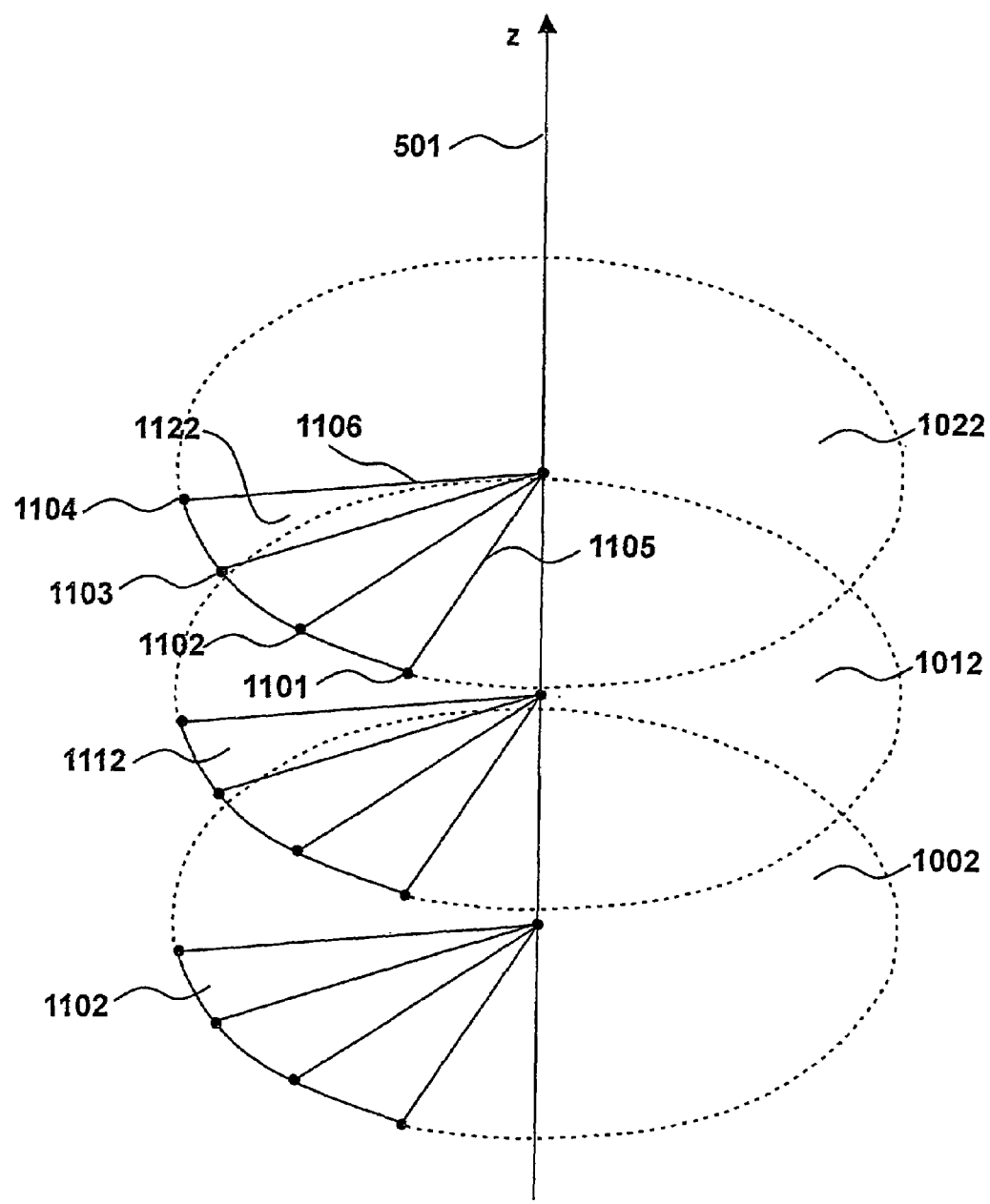
FIG. 11 illustrates the process step 704 and shows a selected segment of data points from three of the planes 1002, 1012 and 1022.

The process step 704 is illustrated by FIG. 11, which shows a selected segment of data points from three of the planes 1002, 1012 and 1022. In FIG. 11, for simplicity, only three planes are illustrated and only four points are illustrated on each slice of a plane. However, it should be understood that in practice many times those numbers would be used to provide the object with sufficient definition.

For the purposes of the description, an area of each plane defined by the data points and the perpendicular line drawn from the z axis to the outermost data points will be referred to as a slice. For example, slice 1122 is defined by the data points 1101, 1102, 1103, 1104 and the lines 1105 and 1106 drawn from the z axis 501 to the outermost points 1101 and 1104 respectively.

In order to defined the surface of the object completely by the six segments, the outermost data points such as 1101 and 1104 are used in two selected segments. Thus, in the present example, each slice has four data points, two of which are also included in adjacent segments. It will therefore be understood that the number of data points in a slice is equal to one more than the number of data points in a plane divided by the number of bi-cones required.

FIG. 12

Figure 12:
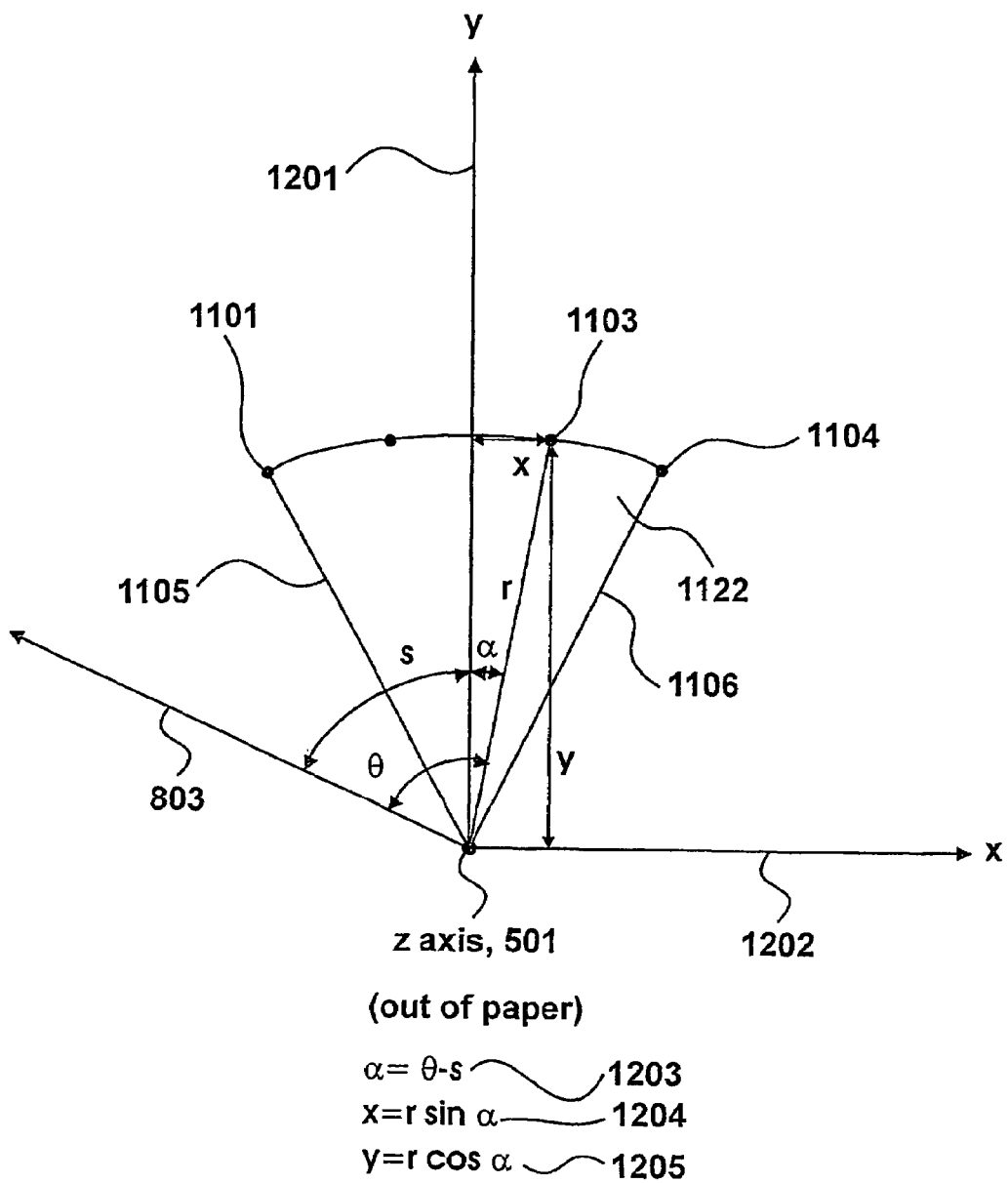
FIG. 12 illustrates the process step 705 and shows slice 1122 of FIG. 11 but with the z axis 501 extending upwards from the page.

The process step 705 is illustrated by FIG. 12. Before process step 705 is performed, each point generated at step 702 is defined by three cylindrical co-ordinates, namely radial distance, r, from the z axis 501, its distance, z, along the z axis, and its angular position, referred to as θ, around from an arbitrary axis 803. The process step 705 calculates local three dimensional Cartesian co-ordinates, (x,y,z), for each point from its cylindrical co-ordinates (r,z,θ).

Slice 1122 is shown in FIG. 12, which has the z axis 501 extending upwards from the page. A y axis is defined which extends perpendicularly from the z axis and bisects the angle formed by lines 1105 and 1106 which define edges of the slice 1122. The y axis is thus chosen to be at an angle S around from the arbitrary axis 803. It should be understood that the remaining segments (in this case five) similarly each have their own locally defined y axes, and these axes will be angularly spaced around from y axis 1201 by a multiple of sixty degrees, i.e 360 degrees divided by the number of required bi-cones. A local x axis 1202 is also defined which extends perpendicularly from the y and z axes.

As shown in FIG. 12, at 1203, for each point, such as point 1103, the angle a around from the y axis 1201 is calculated by subtracting the angle S from angle θ. The x value is then calculated by multiplying the radial distance of the point, r, by the sine of the angle α, as shown at 1204. Similarly, the y value is calculated as r multiplied by the cosine of the angle α, as shown at 1205. It will be understood that the new Cartesian co-ordinate value of z is simply equal to the cylindrical co-ordinate value z.

FIG. 13

Figure 13:
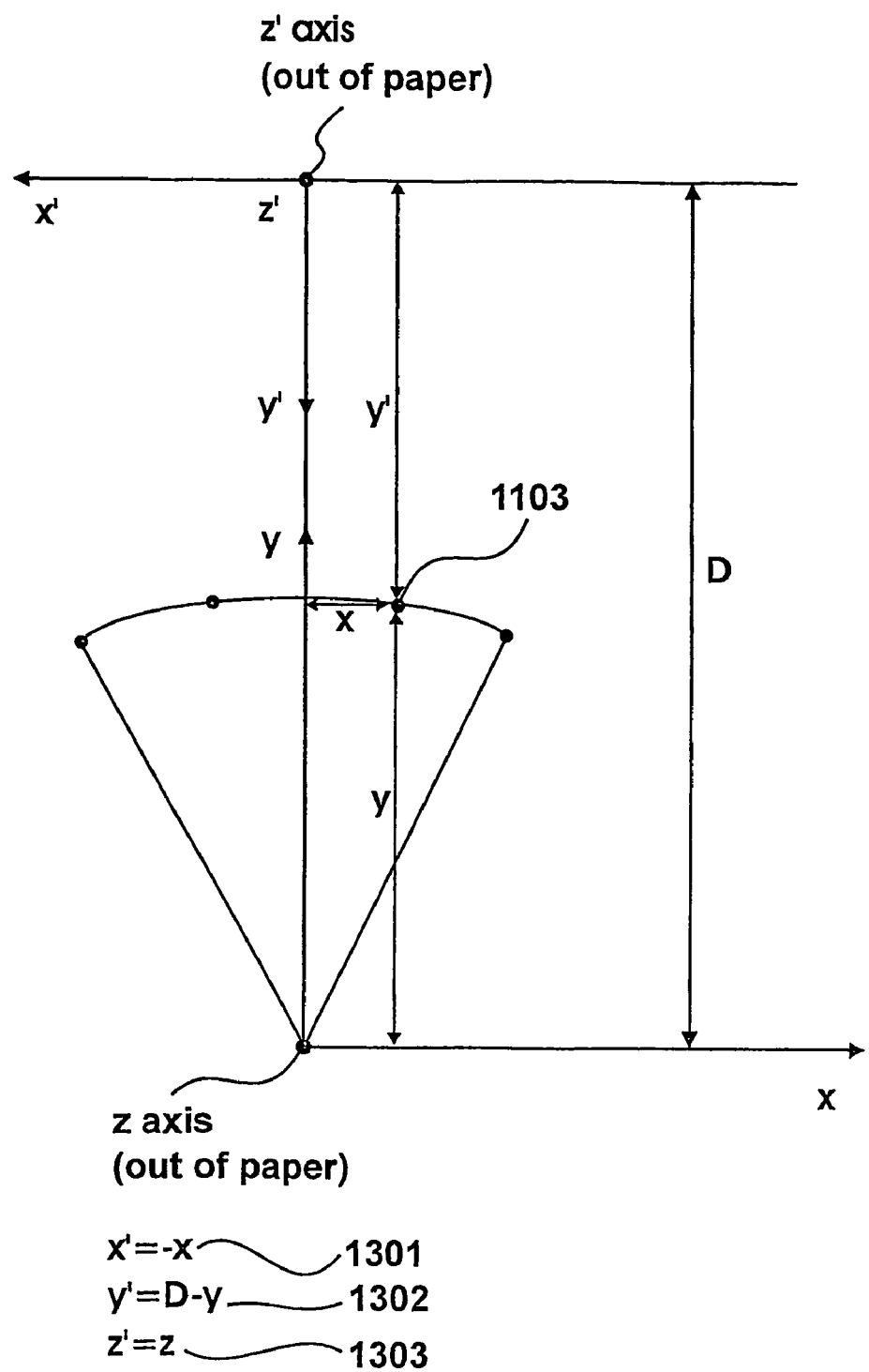
FIG. 13 illustrates the process step 706 of translating the points on a positive surface to points on a negative surface.

The process step 706 of translating the points on a positive surface to points on a negative surface is illustrated by FIG. 13. In practice, this step merely defines each data point in terms of a new Cartesian co-ordinate system, having axes x', y', and z', such that: the z' axis is parallel with the z axis and separated by a distance D equal to the radius of a bi-cone; the x' axis extends from the z' axis parallel with the x axis, and the y' axis is collinear with the y axis but extends in the opposite direction.

Thus, as illustrated in FIG. 13, each point, such as point 1103 is re-defined within the new Cartesian co-ordinate system by coordinates (x',y',z') where x' is equal to −x (as shown at 1301), y' is equal to distance D minus y (as shown at 1302), and z' is equal to z (as shown at 1303).

FIG. 14

Figure 14:
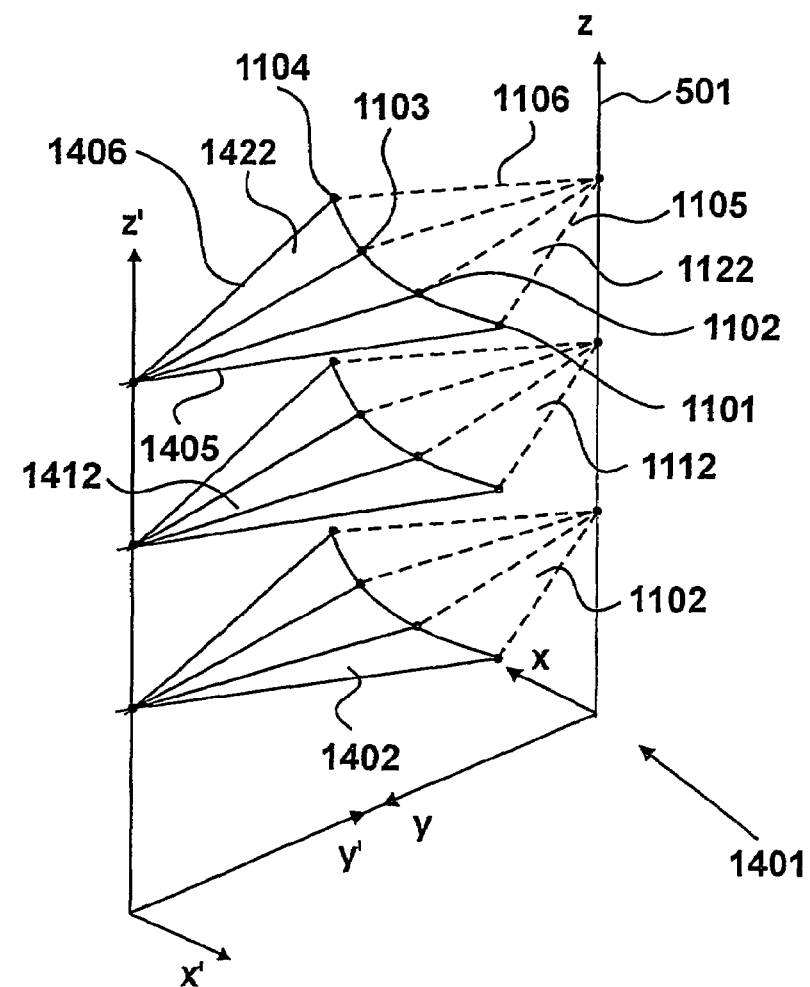
FIG. 14 illustrates the processing step 707 of wrapping the negative surface around an axis at 1450.
Figure 14:
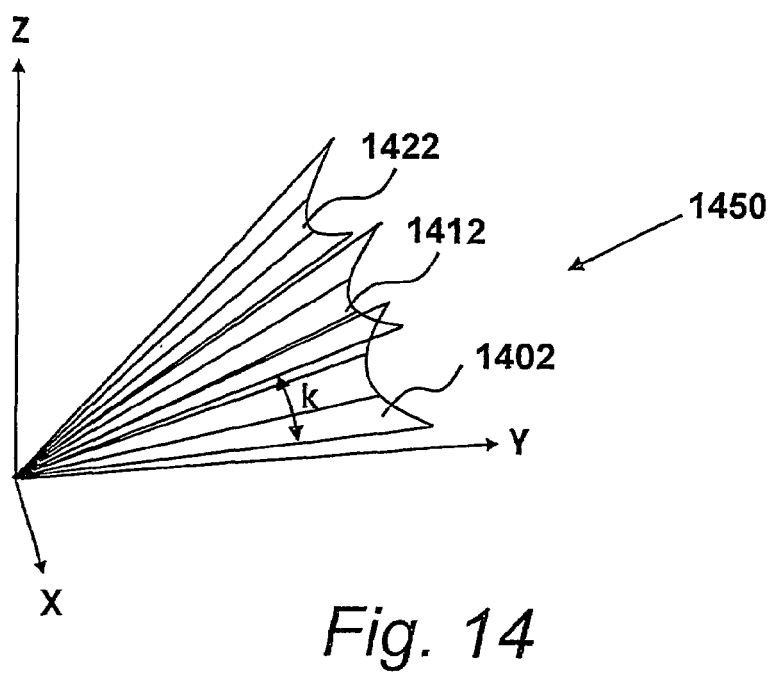

The effect of step 706 is illustrated at 1401 in FIG. 14.

As described above, when the data points were defined in terms of the x, y, z axes, they could be considered to define slices, such as slices 1102, 1112 and 1122, of a segment; that segment having an outer surface defining a part of the surface of the object. Now that the points are defined in terms of the new axes, x', y', z', they may be considered as defining new slices, such as slices 1402, 1412 and 1422, defining a segment having a negative outer surface.

For example, as shown in FIG. 14, slice 1122 is defined by points 1101, 1102, 1103, 1104 and lines 1105 and 1106 extending from the z axis to the outermost points 1101 and 1104, and similarly, in the new co-ordinate system, a new slice 1422 is defined by points 1101, 1102, 1103, 1104 and lines 1405 and 1406 extending from the z' axis to the outermost points 1101 and 1104.

The processing step 707 of wrapping the negative surface around an axis is also illustrated in FIG. 14 as shown at 1450. Step 707 is achieved by calculating an angle for each point such that the angle is directly proportional to its z' value. Thus, in the present example an angle, kz', is calculated which is the product of the z' value of the point and a constant k. (The value of k is chosen such that data points on the slices extend by a required angle around a full circle.) The slices may then be considered to be positioned around the X axis of a new Cartesian co-ordinate system having axes X, Y, and Z, such that their local y' axes are coplanar with the new YZ plane, and the angle of each new slice from the XY plane is the calculated angle kz'.

For example, as shown in FIG. 14, the new slices 1402, 1412 and 1422 may be arranged around the new X axis separated by an angle k.

FIG. 15

Figure 15:
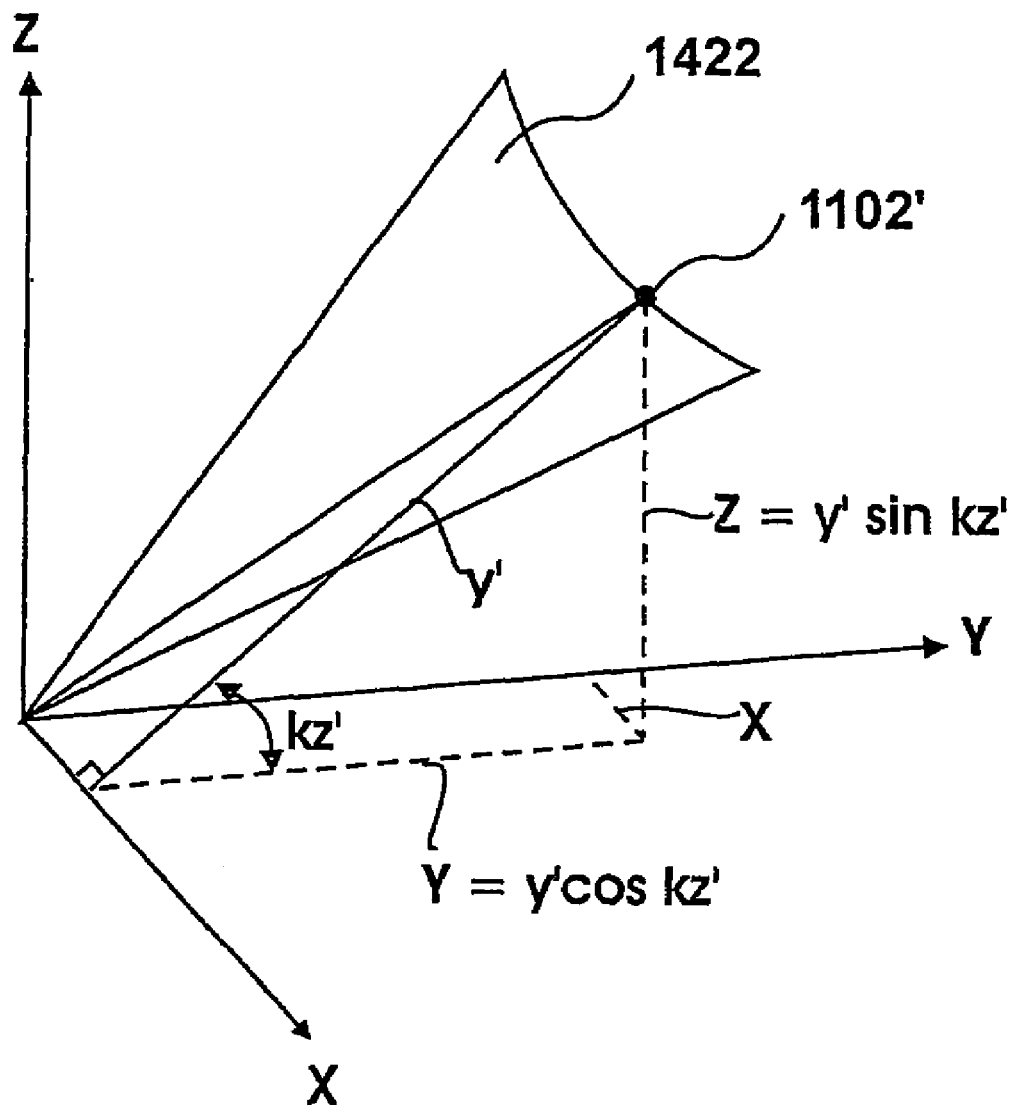
FIG. 15 illustrates the processing step 708 of generating global Cartesian co-ordinates.

The processing step 708 of generating global Cartesian co-ordinates is illustrated by FIG. 15. For each point on the slices wrapped around the new X axis, such as point 1102' on new slice 1422, new Cartesian co-ordinates (X,Y,Z) are calculated. As will be apparent from FIG. 15 for each point: the Y value is the product of the y' value and the cosine of the angle kz'; the Z value is the product of the y' value and the sine of the angle kz'; and the X value is equal to the x' value.

Figure 16:
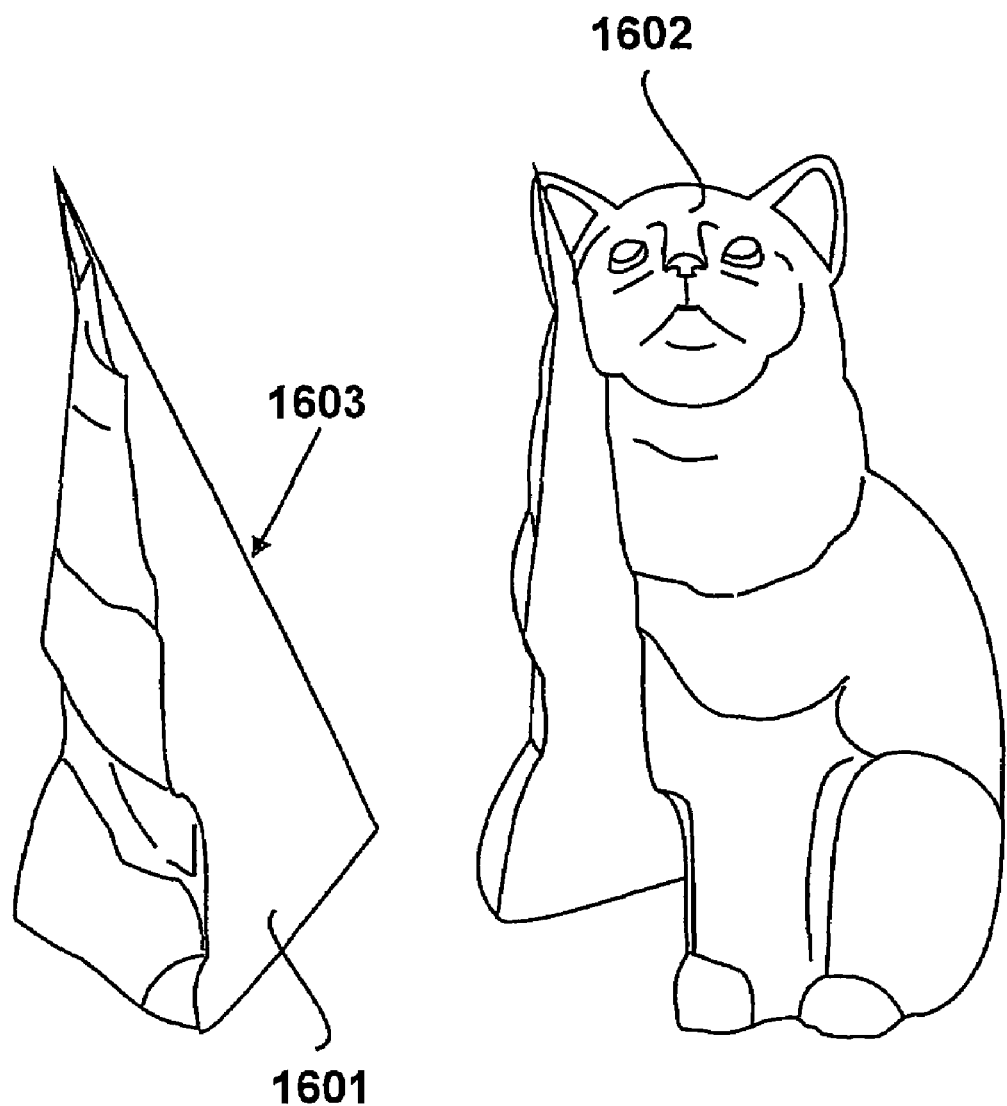
FIG. 16 shows a first segment 1601 selected from the remaining five segments 1602.
Figure 17:
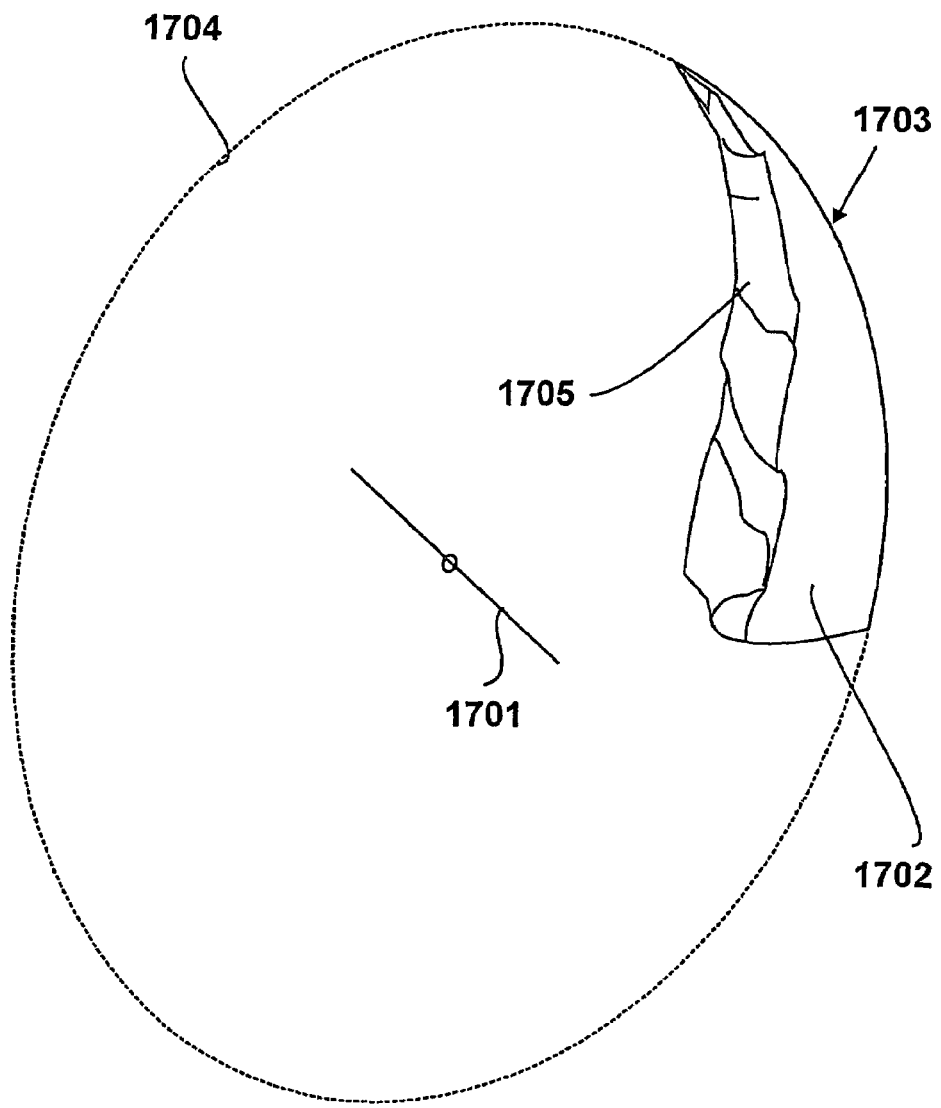
FIG. 17 illustrates step 707 in which the data points of segment 1601 are transformed by wrapping around an axis.

FIGS. 16 and 17

FIGS. 16 and 17 provide a simplified demonstration of how the data points obtained in step 302 are manipulated to generate the data points of step 708.

Step 704 at which a segment is selected is illustrated in FIG. 16. Thus, FIG. 16 shows a first segment 1601 selected from the remaining segments 1602. The segment 1601 has a straight edge 1603 which corresponds with the original axis 501 of the object 401, i.e. in the present embodiment the axis of rotation during scanning.

The data points of segment 1601 are subsequently transformed by wrapping them around an axis at step 707 as demonstrated in FIG. 17. Thus segment 1601 may be considered to be deformed to generate a deformed segment 1702 such that the edge 1603 is formed into an arc 1703 of a circle 1704 having the axis 1701 at is centre. Consequently, data points defining the surface of the original object 401 which had positions defined relative to an axis (501) undergo a transformation such that the axis is transformed onto an arc of a circle (1704).

The data points defining the deformed surface 1705 of the segment 1702 are then used at step 304 to machine the bi-cones.

FIG. 18

Figure 18:
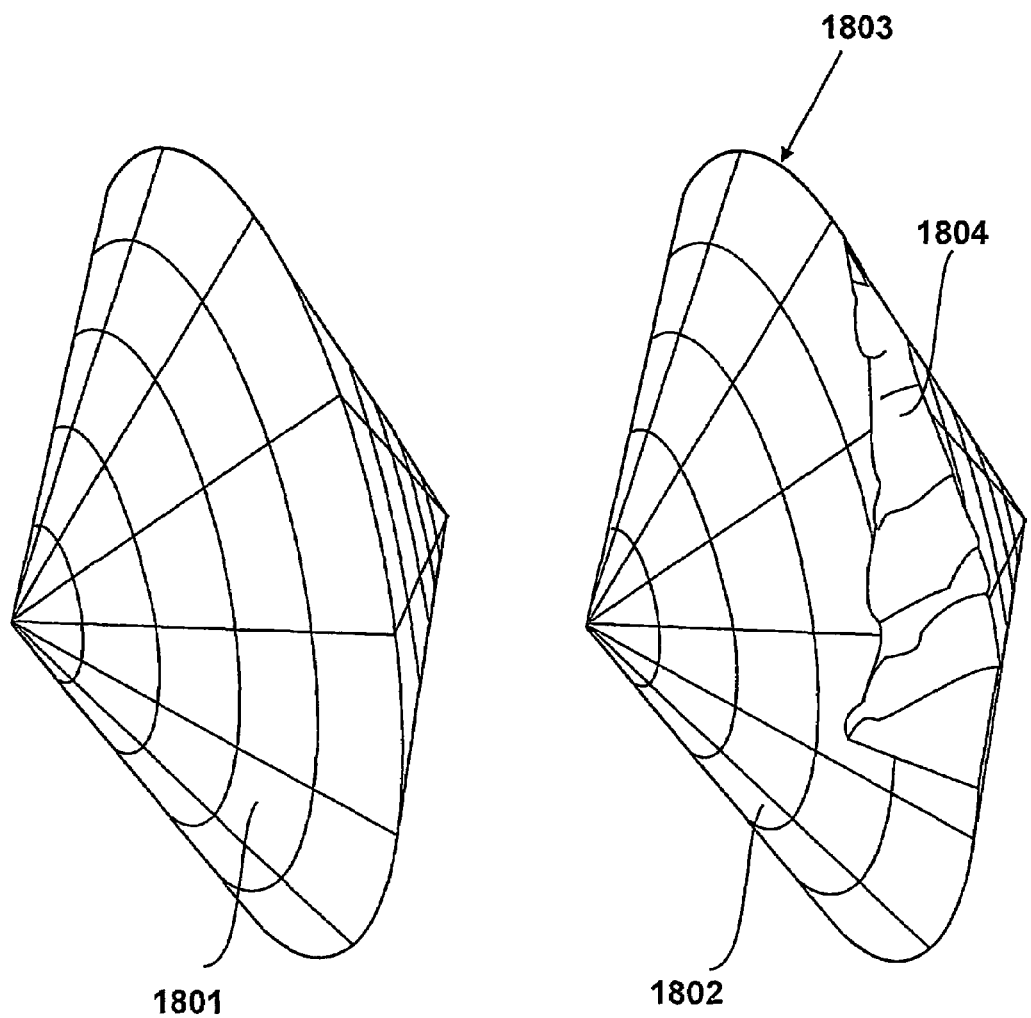
FIG. 18 shows a first bi-cone 1801 before machining and a second bi-cone 1802 after the machining step 304.

A first bi-cone 1801 is shown before machining and a second bi-cone 1802 is shown after the machining step 304 in FIG. 18. Thus, the bi-cone 1802 has been machined around a part of its edge 1803 to produce a machined surface 1804. This surface is configured such that it is the negative of the deformed surface 1705 of FIG. 17, i.e. the volume removed from bi-cone 1802 during machining is the same shape and size as the deformed segment 1702.

In the present example, bi-cones such as bi-cone 1801 is moulded in a food grade polymer and then subsequently machined to produce the deforming surface 1804. However, in an alternative embodiment, the bi-cone is formed with the deforming surface using stero-lithography or similar technique for forming three dimensional objects from three dimensional co-ordinate data.

In one embodiment, the bi-cone is formed of a metal and the deforming surface is created using spark erosion.

Figure 20:
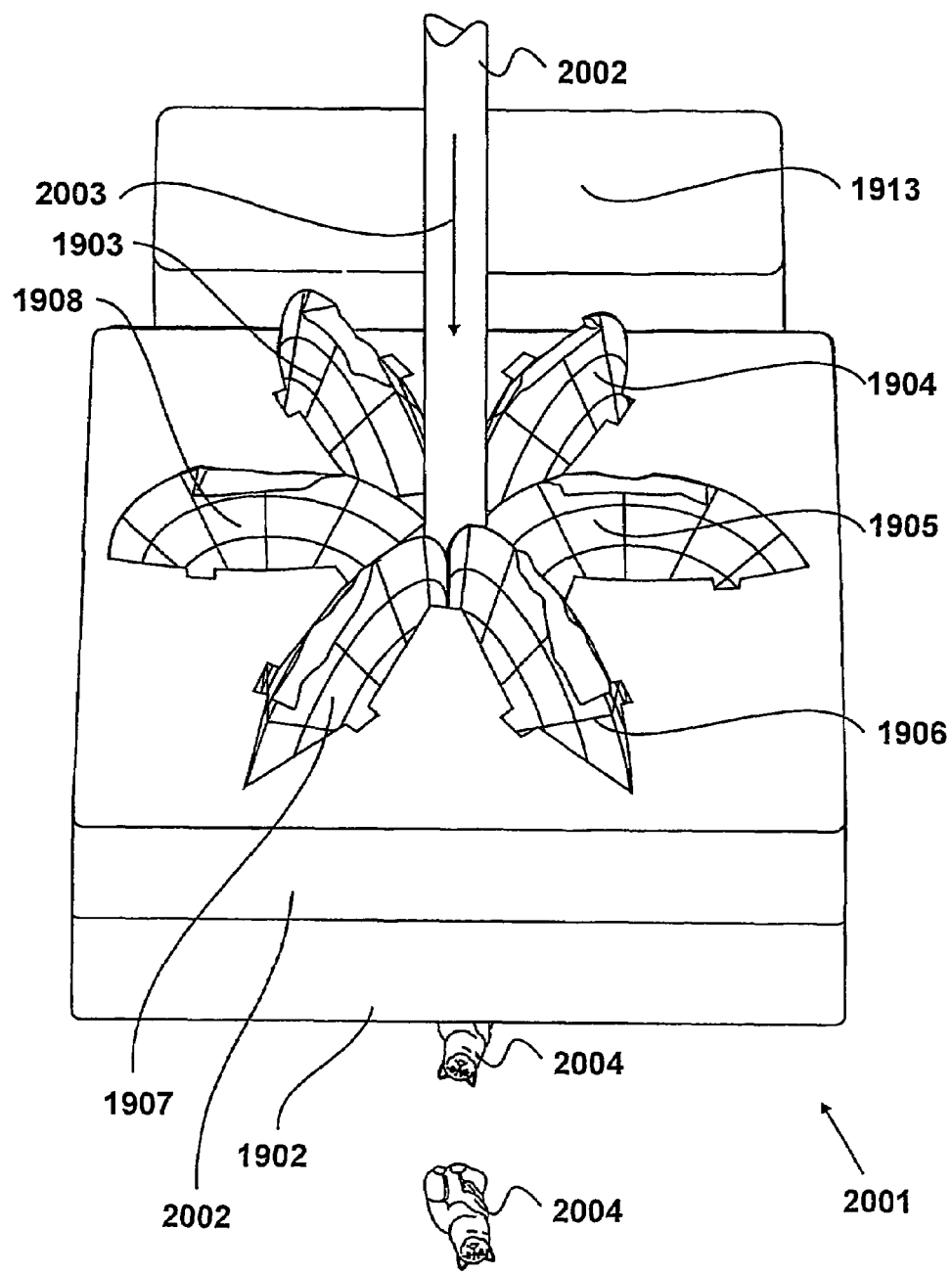
FIG. 20 shows, in operation, the complete apparatus 2001 for producing three dimensional objects from a deformable material.

In the present example, the deforming surface 1804 extends only partly around the edge of the bi-cone 1802. It is possible to scale the object defined as data points following, for example, steps 302, 701, 702 or 705. Consequently, it is possible to arrange the deforming surface to extend completely around the edge of a bi-cone. Alternatively, as illustrated in FIG. 18, the deforming surface may extend only a fraction of the way around the edge. This allows more than one deforming surface to be formed on a single bi-cone. Consequently, if bi-cones having N deforming surfaces around their edges, are used in apparatus (as shown in FIG. 20) to produce articles, a single revolution of the bi-cones produces N articles.

Furthermore, in this manner it is possible to have two or more differently formed deforming surfaces around a single bi-cone, and thus it is be possible to produce differently shaped articles in sequence, e.g. alternating cat, dog and mice shapes.

FIG. 19

Figure 19:
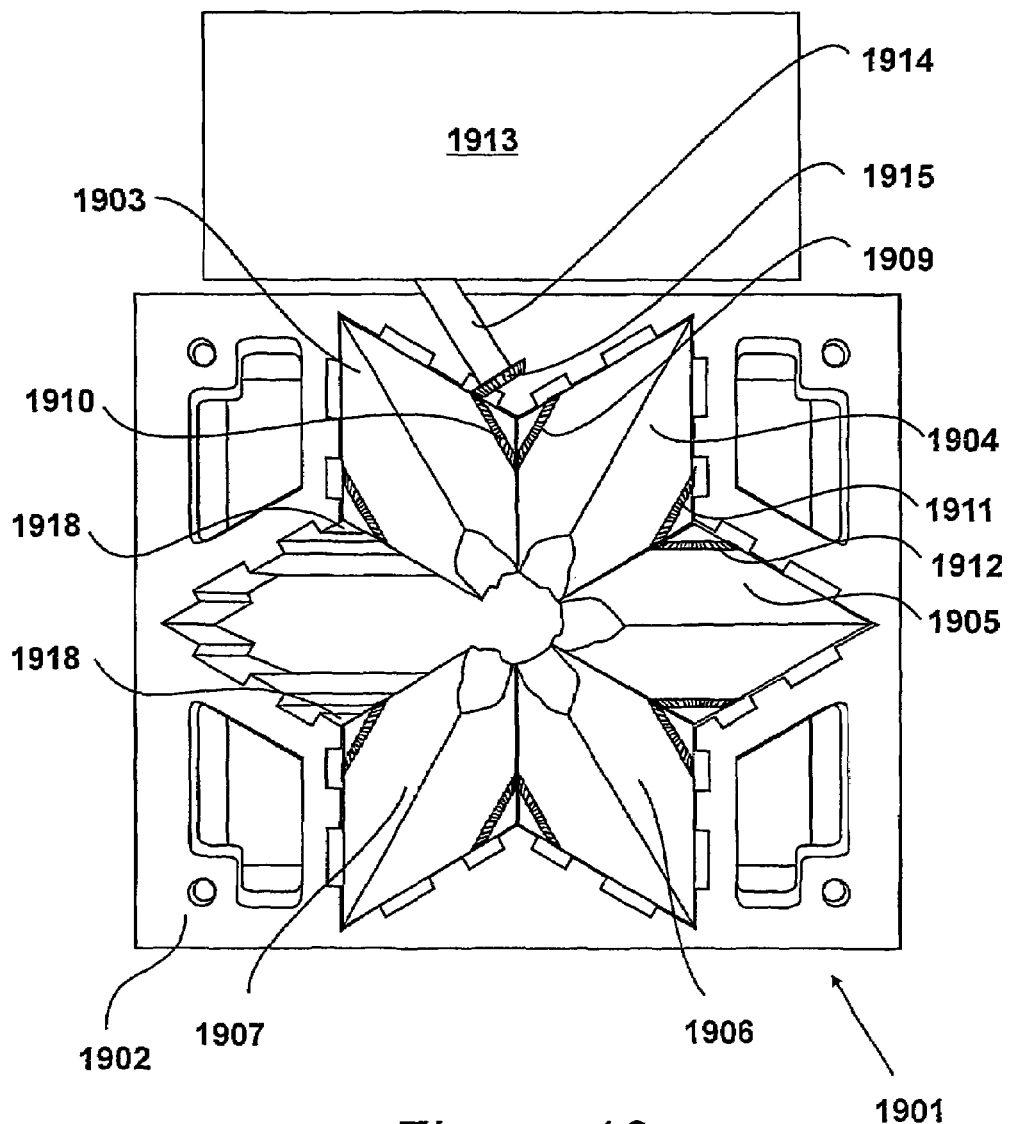
FIG. 19 shows a partially assembled apparatus 1901 for producing three dimensional objects from a deformable material.

A partially assembled apparatus 1901 for producing three dimensional objects from a deformable material is shown in FIG. 19. The complete apparatus includes a frame having an upper and lower half, and six bi-cones located within the frame. However, for the purposes of illustration, FIG. 19 only shows the lower half of the frame 1902 and five bi-cones 1903, 1904, 1905, 1906 and 1907 located within said lower half.

The lower half of the frame 1902 has six pairs of conical bearing surfaces 1918, each pair being configured to receive the two apexes of a bi-cone, such as bi-cone 1904. Once located within the bearing surfaces 1908 a bi-cone is rotatable but is otherwise held in position.

The bi-cones are provided with a gear wheel on each of their conical surfaces concentric with their axes. The gear wheels have teeth configured to mesh with teeth of a gear wheel of an adjacent bi-cone. Thus, bi-cone 1904 has a gear wheel 1909 which meshes with a gear wheel 1910 of bi-cone 1903, an a second gear wheel 1911 which meshes with gear wheel 1912 of bi-cone 1905. By means of the gear wheels the rotation of each bi-cone is synchronised with the rotation of every other bi-cone.

The apparatus is provided with an electric motor and gearing mechanism located within a housing 1913. A drive shaft 1914 extends from the gearing mechanism and terminates in a drive gear 1915 configured to drive gear wheel 1910 of bi-cone 1903. Due to the inter-meshing of the gear wheels of the bi-cones, the electric motor drives all six bi-cones via drive shaft 1914.

In the present embodiment, the bi-cones are generally made from a polymer, but the gear wheels are formed in a suitable metal bonded into a recess in the conical surfaces.

FIG. 20

The complete apparatus 2001 for producing three dimensional objects from a deformable material is shown in operation in FIG. 20. Thus, the upper half 2002 is located on the lower half 1902 of the frame, and all six bi-cones 1903 to 1908 are located within the frame.

A cylindrical rod of deformable material 2002, in this example liquorice, is lowered into the middle of the six bi-cones. The bi-cones are driven by the electric motor within housing 1913 such that their edges tend to pull the deformable material through in direction of arrow 2003. As the material 2002 passes between the bi-cones they roll over its surface and compress the material into the shape of the cat object 401 to produce articles 2004.

Due to the varying cross-sectional area of the object 401, the rate at which material 2002 should be fed through the bi-cones varies. In the present embodiment, the liquorice is fed into the bi-cones by gravity in co-operation with a pulling force exerted by the bi-cones. However, in an alternative embodiment, a control feed mechanism feeds the material 2002 into the apparatus 2001 at a controlled rate such that the rate is inversely proportional to the cross-sectional area of the object being formed. I.e., as a part of the object is being formed that has a small cross-sectional area, the material feed rate is reduced, and as a part is being formed with a large cross-sectional area the feed rate is increased.

In the above described embodiment, the apparatus included six bi-cones, but apparatus including between three and twelve bi-cones is also envisaged. The conical angle of such bi-cones is chosen, like those above, such that their conical surfaces allow all the bi-cones to fit around 360 degrees and make contact with neighbouring bi-cones at their edges.

In the above embodiment, the object was defined in terms of data points by a helical scanning process. However, in alternative embodiments other scanning regimes exist which allow for the subsequent data processing steps to be reduced. For example, in one embodiment the scanning apparatus is configured to scan plane by plane, such that interpolation step 702 is not required.

Furthermore, in an alternative embodiment the data points defining the object are not produced by scanning but are manually produced on a computer system using computer aided design (CAD) software. The data points generated by the CAD software are then subjected to interpolation to produce data points having axial and angular alignment, as produced at step 702.

The invention claimed is:

1. Apparatus for producing three-dimensional objects from a deformable material, comprising:
   deforming means configured to receive deformable material substantially continuously in a direction of production and to produce three dimensionally deformed items substantially in said direction of production, wherein
   said deforming means includes a plurality of rotatable devices supported in a frame and arranged in a co-operating configuration, each of said rotatable devices having a pair of substantially conical surfaces extending from a shared base to define a deforming surface between said pair of surfaces arranged to deform a section of deformable material, and
   at least one of said plurality of rotatable devices has a deforming surface shaped so as to vary the extent of deformation applied to the deformable material periodically as said deformable material passes through the deforming means while the rotatable devices are being rotated.

2. The apparatus according to claim 1, wherein said objects are novelty or decorative objects.

3. The apparatus according to claim 1, wherein said deformable material is a confectionery material.

4. The apparatus according to claim 1, wherein there are between three and twelve rotatable devices.

5. The apparatus according to claim 4, wherein there are six rotatable devices.

6. The apparatus according to claim 1, wherein the deforming surface of each of said rotatable devices is shaped so as to allow deformation by said plurality of rotatable devices to be imparted upon substantially the totality of said material so as to generate three dimensional articles with variable section.

7. The apparatus according to claim 1, wherein each of said rotatable devices defines a substantially circular edge from which material is removed to define a varying deforming surface.

8. The apparatus according to claim 7, wherein material is removed from said substantially circular edge to define a plurality N of deforming surfaces.

9. The apparatus according to claim 8, wherein said plurality N of deforming surfaces includes a first deforming surface and a second deforming surface that is different from said first deforming surface.

10. The apparatus according to claim 1, in which said rotatable devices co-operate by the presence of co-operating gear teeth.

11. The apparatus according to claim 10, wherein a property of said co-operating gear teeth varies between rotatable devices so as to discourage the incorrect ordering of said devices within said frame.

12. A first rotatable device for use in apparatus for shaping a deformable material, comprising:
    a first substantially conical surface for engagement with a similar co-operating surface of a second similar rotatable device;
    a second substantially conical surface for engagement with a similar co-operating surface of a third similar rotatable device; and
    a deforming surface between said first substantially conical surface and said second substantially conical surface arranged to deform a section of deformable material, wherein
    said first rotatable device is arranged to be supported in a frame in a co-operating configuration with said second and third similar rotatable devices, and
    said deforming surface of said first rotatable device is shaped so as to vary the extent of deformation applied to the deformable material periodically while the rotatable device is being rotated.

13. The first rotatable device according to claim 12, wherein the shape of said deforming surface is produced by a machining operation upon a bi-conical blank that defines a substantially circular edge from which material is removed by said machining operation.

14. A method of producing three dimensional objects, comprising the steps of:
    defining a three dimensional data model;
    segmenting said data model into a plurality of data model segments;
    producing a plurality of rotatable devices such that each one of said rotatable devices has a deforming surface corresponding to one of said data model segments;
    arranging said plurality of rotatable devices in a frame arranged to support said rotatable devices in a co-operating configuration to define an orifice and a direction of production through said orifice, said orifice having a section that varies periodically while said rotatable devices are being rotated; and
    passing deformable material in said direction of production while said rotatable devices are being rotated so as to produce three dimensional objects.

15. The method according to claim 14, wherein said three dimensional data model is defined by a cylindrical co-ordinate system.

16. A method of processing three dimensional data for the production of three dimensional objects, comprising the steps of:
    Identifying a linear axis;
    defining a three dimensional data model with respect to said linear axis in which a plurality of three dimensional data points define a surface;
    re-arranging said data model data points into data points defined by cylindrical co-ordinates on a positive outer surface with respect to said linear axis;
    segmenting said re-arranged data points to produce a plurality of segments, each segment comprising a plurality of said data model data points and each said segment being angularly separated about said linear axis from other such segments;
    in respect of each segment, translating said data model data points to data points on a negative outer surface, and
    transforming said translated data model data points to produce control instructions for a production machine, wherein, in respect of each segment, said step of transforming comprises a transformation such that said linear axis is transformed onto an arc of a circle.

17. A method according to claim 16, wherein said three dimensional data model is produced by scanning a physical object to generate a three dimensional data model.

18. A method according to claim 16, wherein said three dimensional data model is produced by scanning a physical object in a helical path and said re-arranging step re-arranges said helically positioned points into cylindrically positioned points.

19. A method according to claim 16, wherein the re-arranged data points define a plurality of cross-sectional profiles with the same number of points on each cross-sectional profile, with points on each cross-sectional profile being substantially aligned with points on an adjacent cross-sectional profile.

20. A method of producing three dimensional objects, comprising the steps of:
    defining a three dimensional data model;
    segmenting said data model into a plurality of data model segments;
    producing a plurality of rotatable devices such that each one of said rotatable device has a deforming surface corresponding to one of said data model segments;
    arranging said rotatable devices in a frame arranged to support said rotatable devices in a co-operating configuration to define a direction of production through an orifice having a section that varies periodically while said rotatable devices are being rotated; and
    passing deformable material in said direction of production while said rotatable devices are being rotated to as to produce three dimensional objects, wherein each of said rotatable devices has a pair of substantially conical surfaces extending from a shared base to define a substantially circular edge between said pair of surfaces from which material is removed to define said deforming surface.

* * * * *